US012563489B2

(12) United States Patent
Park et al.

(10) Patent No.: US 12,563,489 B2
(45) Date of Patent: Feb. 24, 2026

(54) SETTING AN OPERATIONAL MODE OF A CIRCUIT FOR COMMUNICATIONS

(71) Applicant: QUALCOMM INCORPORATED, San Diego, CA (US)

(72) Inventors: Cheol Hee Park, San Diego, CA (US); Ayushi Jain, Hyderabad (IN); Ajaykumar Ramaswamy, San Diego, CA (US); Gang Andy Xiao, San Diego, CA (US); Jintao Hou, Beijing (CN); Hongjin Guo, Beijing (CN); Yi Qin, Beijing (CN); Zengyu Hao, Beijing (CN); Feng Chen, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 346 days.

(21) Appl. No.: 18/003,789

(22) PCT Filed: Aug. 25, 2020

(86) PCT No.: PCT/CN2020/111030
§ 371 (c)(1),
(2) Date: Dec. 29, 2022

(87) PCT Pub. No.: WO2022/040905
PCT Pub. Date: Mar. 3, 2022

(65) Prior Publication Data
US 2023/0239787 A1      Jul. 27, 2023

(51) Int. Cl.
*H04W 52/02*      (2009.01)
*H04W 76/14*      (2018.01)

(52) U.S. Cl.
CPC ..... *H04W 52/0216* (2013.01); *H04W 52/028* (2013.01); *H04W 76/14* (2018.02)

(58) Field of Classification Search
CPC ........... H04W 52/0216; H04W 52/028; H04W 72/02; H04W 76/14; H04W 92/18; Y02D 30/70
See application file for complete search history.

(56) References Cited

U.S. PATENT DOCUMENTS

2010/0020696 A1* 1/2010 Tung ................... H04W 40/005
                                                     370/241
2014/0301262 A1* 10/2014 Homchaudhuri .........................
                                                     H04W 52/0216
                                                     370/311
(Continued)

FOREIGN PATENT DOCUMENTS

CN        103369640 A      10/2013
CN        104796976 A       7/2015
(Continued)

OTHER PUBLICATIONS

International Search Report and Written Opinion—PCT/CN2020/111030—ISA/EPO—May 21, 2021 (204264WO1).
(Continued)

*Primary Examiner* — Benjamin H Elliott, IV
(74) *Attorney, Agent, or Firm* — Holland & Hart LLP

(57) ABSTRACT
Methods, systems, and devices for wireless communications are described. Generally, the user equipment (UE) may adjust an operational mode of a circuit of the UE by selecting one or more parameters (e.g., power level or clock frequency or both). Adjusting parameter values may result in avoiding increased temperature. The UE may set an operational mode of a circuit based on a determination or a prediction of a number of blind decodes to be performed, a number of pending receive packets, or a number of transmitting UEs from which the UE will receive traffic. The UE may efficiently reduce unnecessary power expenditures and decrease temperature.

32 Claims, 18 Drawing Sheets

(56) References Cited

U.S. PATENT DOCUMENTS

| | | | | |
|---|---|---|---|---|
| 2019/0150157 A1* | 5/2019 | Panteleev | ............. | H04W 76/14 |
| | | | | 370/329 |
| 2019/0229964 A1* | 7/2019 | Ouchi | ................... | H04L 5/0051 |
| 2019/0289459 A1* | 9/2019 | Shan | ..................... | H04W 76/25 |
| 2019/0289554 A1* | 9/2019 | Li | ...................... | H04W 52/367 |
| 2020/0068534 A1* | 2/2020 | Li | ..................... | H04W 74/0808 |
| 2020/0084811 A1* | 3/2020 | Uchiyama | ............. | H04W 76/14 |
| 2020/0145799 A1 | 5/2020 | Baghel et al. | | |
| 2020/0260231 A1* | 8/2020 | Ganesan | ............... | H04L 1/1825 |
| 2021/0229698 A1* | 7/2021 | Kim | ...................... | H04B 7/088 |
| 2021/0250924 A1* | 8/2021 | Ji | .......................... | H04W 72/23 |
| 2022/0086860 A1* | 3/2022 | Panteleev | ............. | H04L 5/0042 |
| 2022/0116951 A1* | 4/2022 | Chen | ..................... | H04L 5/0044 |
| 2022/0123904 A1* | 4/2022 | Wang | ................... | H04L 1/0038 |
| 2022/0256469 A1* | 8/2022 | Khan | ................... | H04W 52/54 |
| 2023/0052126 A1* | 2/2023 | Nam | ..................... | H04L 5/0048 |
| 2023/0239787 A1* | 7/2023 | Park | ................... | H04W 52/028 |
| | | | | 370/311 |

FOREIGN PATENT DOCUMENTS

| | | | |
|---|---|---|---|
| CN | 110536261 A | 12/2019 | |
| WO | WO-2018174610 A1 | 9/2018 | |
| WO | WO-2020063665 A1 | 4/2020 | |
| WO | 2020088141 A1 | 5/2020 | |
| WO | 2020143416 A1 | 7/2020 | |

OTHER PUBLICATIONS

Supplementary European Search Report—20950580—Search Authority—Munich—Jul. 22, 2024 (204264EP).
Supplementary Partial European Search Report—EP20950580—Search Authority—Munich—Apr. 8, 2024 (204264EP).

* cited by examiner 210-a 210-b

205

215-a 215-b 210-c

200

PSSCH 335

SCI-2 325

DMRS 330

PSCCH 320

Rx AGC 315

Gap 340

Subframe 310

Slot 305

300

MAC Subheader 805

800

915

910    Identify A Number Of UEs

920    Determine Clock Frequency
       and Voltage Level

925

905

900

1210

1215

1220

1205

1200

Resource Configuration
Manager

1410

Connection Manager

1420

Threshold Manager

1430

Blind Decoding Manager

1440

Data Packet Identification
Manager

1450

Operational Mode Manager

1415

Adjustable Parameter Manager

1425

Operational Bandwidth
Manager

1435

Device Identifier Manager

1445

1405

1400

Identify a resource configuration for a
sidelink wireless connection for
communicating with at least a second UE
— 1605

Set an operational mode of a circuit of the
first UE, based on the identified resource
configuration
— 1610

Use the circuit, at least in part, to
communicate with the at least the second
UE via the sidelink wireless connection
— 1615

— 1600

Identify a number of UEs configured to
communicate with the first UE on a
sidelink wireless connection

1705

Set an operational mode of a circuit of the
first UE, based on the identified number of
UEs

1710

Use the circuit, at least in part, to
communicate with at least a second UE of
the number of UEs via the sidelink
wireless connection

1715

1700

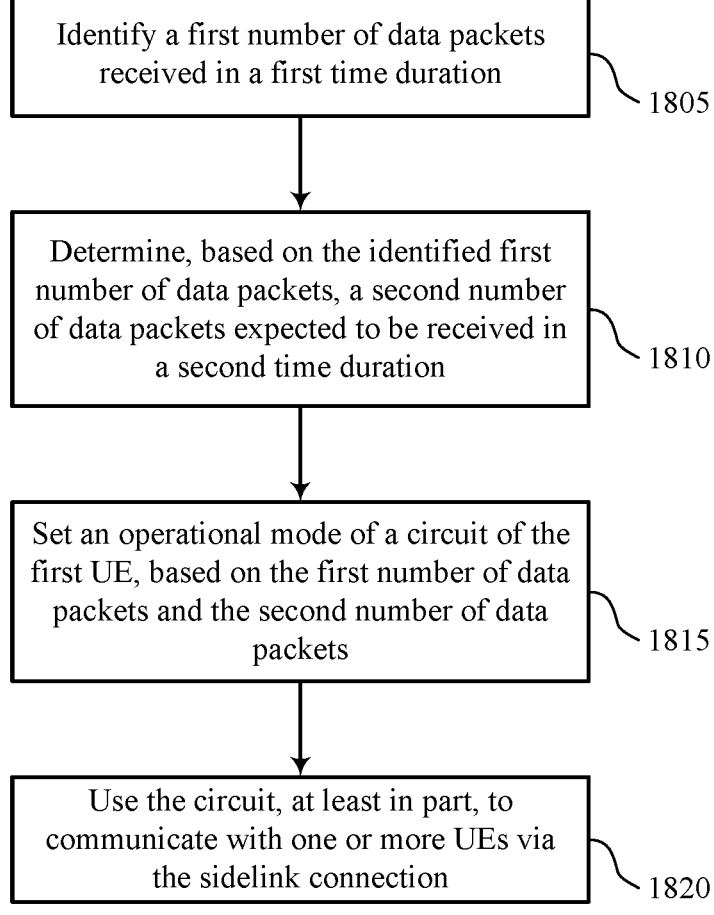

Identify a first number of data packets received in a first time duration

1805

Determine, based on the identified first number of data packets, a second number of data packets expected to be received in a second time duration

1810

Set an operational mode of a circuit of the first UE, based on the first number of data packets and the second number of data packets

1815

Use the circuit, at least in part, to communicate with one or more UEs via the sidelink connection

SETTING AN OPERATIONAL MODE OF A CIRCUIT FOR COMMUNICATIONS

CROSS REFERENCE

The present Application is a 371 national stage filing of International PCT Application No. PCT/CN2020/111030 by PARK et al. entitled "ADAPTIVE OPERATIONAL MODE SETTING FOR CIRCUITS," filed Aug. 25, 2020, which is assigned to the assignee hereof, and which is expressly incorporated by reference in its entirety herein.

FIELD OF TECHNOLOGY

The following relates generally to wireless communications and more specifically to adaptive operational mode setting for circuits.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). In some examples, a wireless communications system may support one or more UEs performing vehicle based communications.

SUMMARY

The described techniques relate to improved methods, systems, devices, and apparatuses that support adaptive operational mode setting. In some examples, a V2X device may adapt an operational mode of a circuit (e.g., may select one or more adjustable parameter values). Adapting the operational mode of the circuit may result in to avoiding increased temperatures, and any negative impact of high temperatures and resulting thermal issues. Power expenditures and resulting temperatures may be affected by a number of blind decodes a V2X device is configured to perform, or an amount of receive traffic the V2X device is expected to experience, or the like. Thus, a V2X device may adapt the operational mode of the circuit, for example, based on a determination or a prediction of a number of blind decodes to be performed, a number of pending receive packets, or a number of transmitting UEs from which the V2X device will receive traffic. Having made such determinations or predictions, a V2X device may adapt the operational mode of the circuit by selecting one or more adjustable parameter values (e.g., set voltage levels, clock frequencies, or the like). This may reduce unnecessary power expenditures and decrease temperature at the V2X device.

A method of wireless communications at a first UE is described. The method may include identifying a resource configuration for a sidelink wireless connection for communicating with at least a second UE, setting an operational mode of a circuit of the first UE, based on the identified resource configuration, and using the circuit, at least in part, to communicate with the at least the second UE via the sidelink wireless connection.

An apparatus for wireless communications at a first UE is described. The apparatus may include a processor, memory coupled with the processor, and instructions stored in the memory. The instructions may be executable by the processor to cause the apparatus to identify a resource configuration for a sidelink wireless connection for communicating with at least a second UE, set an operational mode of a circuit of the first UE, based on the identified resource configuration, and use the circuit, at least in part, to communicate with the at least the second UE via the sidelink wireless connection.

Another apparatus for wireless communications at a first UE is described. The apparatus may include means for identifying a resource configuration for a sidelink wireless connection for communicating with at least a second UE, setting an operational mode of a circuit of the first UE, based on the identified resource configuration, and using the circuit, at least in part, to communicate with the at least the second UE via the sidelink wireless connection.

A non-transitory computer-readable medium storing code for wireless communications at a first UE is described. The code may include instructions executable by a processor to identify a resource configuration for a sidelink wireless connection for communicating with at least a second UE, set an operational mode of a circuit of the first UE, based on the identified resource configuration, and use the circuit, at least in part, to communicate with the at least the second UE via the sidelink wireless connection.

Some examples of the method, apparatuses, and non-transitory computer-readable medium described herein may further include operations, features, means, or instructions for determining the at least one adjustable parameter based on the identified resource configuration.

In some examples of the method, apparatuses, and non-transitory computer-readable medium described herein, the at least one adjustable parameter includes a clock frequency that may be adjustable and utilized in at least a portion of the circuit.

In some examples of the method, apparatuses, and non-transitory computer-readable medium described herein, the at least one adjustable parameter includes a voltage level that may be adjustable and utilized in at least a part of the circuit.

Some examples of the method, apparatuses, and non-transitory computer-readable medium described herein may further include operations, features, means, or instructions for identifying at least one threshold value corresponding to the at least one adjustable parameter, and determining the at least one adjustable parameter further based, at least in part on the at least one threshold value, such that the at least one adjustable parameter satisfies the at least one threshold value.

Some examples of the method, apparatuses, and non-transitory computer-readable medium described herein may further include operations, features, means, or instructions for identifying an operating bandwidth from a set of bandwidths of the resource configuration, and determining the at least one adjustable parameter further based, at least in part, on the operating bandwidth.

In some examples of the method, apparatuses, and non-transitory computer-readable medium described herein, identifying the resource configuration may include operations, features, means, or instructions for identifying a number of subchannels within an operating bandwidth of the resource configuration, a size of subchannels within the operating bandwidth, a number of physical resource blocks per bandwidth, a subcarrier spacing, or a combination thereof.

Some examples of the method, apparatuses, and non-transitory computer-readable medium described herein may further include operations, features, means, or instructions for identifying a number of blind decoding procedures to be performed based, at least in part, on the resource configuration, and determining the at least one adjustable parameter further based, at least in part, on the number of blind decoding procedures to be performed.

In some examples of the method, apparatuses, and non-transitory computer-readable medium described herein, the circuit includes, at least in part, at least a portion of a modem, a transceiver, a processor, memory, an integrated circuit, a circuit board, or some combination thereof of the first UE.

Some examples of the method, apparatuses, and non-transitory computer-readable medium described herein may further include operations, features, means, or instructions for receiving configuration information from another device, and identifying the resource configuration for the sidelink wireless connection based, at least in part, on the configuration information.

In some examples of the method, apparatuses, and non-transitory computer-readable medium described herein, the configuration information includes a radio resource control message, a system information block message, or some combination thereof.

In some examples of the method, apparatuses, and non-transitory computer-readable medium described herein, the resource configuration may be preconfigured at the first UE.

In some examples of the method, apparatuses, and non-transitory computer-readable medium described herein, the sidelink wireless connection includes a cellular vehicle to everything (C-V2X) wireless connection.

A method of wireless communications at a first UE is described. The method may include identifying a number of UEs configured to communicate with the first UE on a sidelink wireless connection, setting an operational mode of a circuit of the first UE, based on the identified number of UEs, and using the circuit, at least in part, to communicate with at least a second UE of the number of UEs via the sidelink wireless connection.

An apparatus for wireless communications at a first UE is described. The apparatus may include a processor, memory coupled with the processor, and instructions stored in the memory. The instructions may be executable by the processor to cause the apparatus to identify a number of UEs configured to communicate with the first UE on a sidelink wireless connection, set an operational mode of a circuit of the first UE, based on the identified number of UEs, and use the circuit, at least in part, to communicate with at least a second UE of the number of UEs via the sidelink wireless connection.

Another apparatus for wireless communications at a first UE is described. The apparatus may include means for identifying a number of UEs configured to communicate with the first UE on a sidelink wireless connection, setting an operational mode of a circuit of the first UE, based on the identified number of UEs, and using the circuit, at least in part, to communicate with at least a second UE of the number of UEs via the sidelink wireless connection.

A non-transitory computer-readable medium storing code for wireless communications at a first UE is described. The code may include instructions executable by a processor to identify a number of UEs configured to communicate with the first UE on a sidelink wireless connection, set an operational mode of a circuit of the first UE, based on the identified number of UEs, and use the circuit, at least in part, to communicate with at least a second UE of the number of UEs via the sidelink wireless connection.

Some examples of the method, apparatuses, and non-transitory computer-readable medium described herein may further include operations, features, means, or instructions for determining the at least one adjustable parameter based on the identified number of UEs.

In some examples of the method, apparatuses, and non-transitory computer-readable medium described herein, the at least one adjustable parameter includes a clock frequency that may be adjustable and utilized in at least a portion of the circuit.

In some examples of the method, apparatuses, and non-transitory computer-readable medium described herein, the at least one adjustable parameter includes a voltage level that may be adjustable and utilized in at least a part of the circuit.

In some examples of the method, apparatuses, and non-transitory computer-readable medium described herein, identifying the number of UEs may include operations, features, means, or instructions for identifying a set of device identifiers associated with respective UEs of the number of UEs.

In some examples of the method, apparatuses, and non-transitory computer-readable medium described herein, setting the operational mode of the circuit of the first UE may include operations, features, means, or instructions for identifying a second number of UEs that communicate with the first UE in a first transmission time interval, and determining, based on the identified second number of UEs, the number of UEs configured to communicate with the first UE in a second TTI.

In some examples of the method, apparatuses, and non-transitory computer-readable medium described herein, a duration of the first TTI may be based on a movement of the first UE.

In some examples of the method, apparatuses, and non-transitory computer-readable medium described herein, setting the operational mode of the circuit of the first UE may include operations, features, means, or instructions for identifying at least one threshold value corresponding to the at least one adjustable parameter, and determining the at least one adjustable parameter further based, at least in part on the at least one threshold value, such that the at least one adjustable parameter satisfies the at least one threshold value.

In some examples of the method, apparatuses, and non-transitory computer-readable medium described herein, the circuit includes, at least in part, at least a portion of a modem, a transceiver, a processor, a memory, an integrated circuit, a circuit board, or some combination thereof of the first UE.

Some examples of the method, apparatuses, and non-transitory computer-readable medium described herein may further include operations, features, means, or instructions for identifying a channel busy ratio for the sidelink wireless connection, where identifying the number of UEs may be identified based on the channel busy ratio.

In some examples of the method, apparatuses, and non-transitory computer-readable medium described herein, identifying the number of UEs may include operations, features, means, or instructions for performing an estimation procedure to determine the number of UEs configured to communicate with the first UE.

In some examples of the method, apparatuses, and non-transitory computer-readable medium described herein, the sidelink wireless connection includes cellular vehicle to everything (C-V2X) wireless connection.

A method of wireless communications at a first UE is described. The method may include identifying a first number of data packets received in a first time duration, determining, based on the identified first number of data packets, a second number of data packets expected to be received in a second time duration, setting an operational mode of a circuit of the first UE, based on the first number of data packets and the second number of data packets, and using the circuit, at least in part, to communicate with one or more UEs via the sidelink connection.

An apparatus for wireless communications at a first UE is described. The apparatus may include a processor, memory coupled with the processor, and instructions stored in the memory. The instructions may be executable by the processor to cause the apparatus to identify a first number of data packets received in a first time duration, determine, based on the identified first number of data packets, a second number of data packets expected to be received in a second time duration, set an operational mode of a circuit of the first UE, based on the first number of data packets and the second number of data packets, and use the circuit, at least in part, to communicate with one or more UEs via the sidelink connection.

Another apparatus for wireless communications at a first UE is described. The apparatus may include means for identifying a first number of data packets received in a first time duration, determining, based on the identified first number of data packets, a second number of data packets expected to be received in a second time duration, setting an operational mode of a circuit of the first UE, based on the first number of data packets and the second number of data packets, and using the circuit, at least in part, to communicate with one or more UEs via the sidelink connection.

A non-transitory computer-readable medium storing code for wireless communications at a first UE is described. The code may include instructions executable by a processor to identify a first number of data packets received in a first time duration, determine, based on the identified first number of data packets, a second number of data packets expected to be received in a second time duration, set an operational mode of a circuit of the first UE, based on the first number of data packets and the second number of data packets, and use the circuit, at least in part, to communicate with one or more UEs via the sidelink connection.

Some examples of the method, apparatuses, and non-transitory computer-readable medium described herein may further include operations, features, means, or instructions for determining the at least one adjustable parameter based on the first number of data packets and the second number of data packets.

In some examples of the method, apparatuses, and non-transitory computer-readable medium described herein, the at least one adjustable parameter includes a clock frequency that may be adjustable and utilized in at least a portion of the circuit.

In some examples of the method, apparatuses, and non-transitory computer-readable medium described herein, the at least one adjustable parameter includes a voltage level that may be adjustable and utilized in at least a part of the circuit.

In some examples of the method, apparatuses, and non-transitory computer-readable medium described herein, a duration of the first time duration may be based on a movement of the first UE.

Some examples of the method, apparatuses, and non-transitory computer-readable medium described herein may further include operations, features, means, or instructions for determining, based on determining the first number of data packets received in the first time duration, an average number of data packets per transmission time interval, where determining the second number of data packets may be based on the average number of data packets per transmission time interval.

In some examples of the method, apparatuses, and non-transitory computer-readable medium described herein, the second number of data packets may be equal to the first number of data packets.

Some examples of the method, apparatuses, and non-transitory computer-readable medium described herein may further include operations, features, means, or instructions for identifying a third number of data packets received in a third time duration, comparing the second number of data packets and the third number of data packets, determining, based on comparing the second number of data packets and the third number of data packets, an updated operational mode of the circuit, and communicating with the one or more UEs on the sidelink wireless connection according to the updated operational mode of the circuit.

Some examples of the method, apparatuses, and non-transitory computer-readable medium described herein may further include operations, features, means, or instructions for identifying at least one threshold value corresponding to the at least one adjustable parameter, and determining the at least one adjustable parameter further based, at least in part, on the at least one threshold value, such that the at least one adjustable parameter satisfies the at least one threshold value.

In some examples of the method, apparatuses, and non-transitory computer-readable medium described herein, the circuit includes, at least in part, at least a portion of a modem, a transceiver, a processor, a memory, an integrated circuit, a circuit board, or some combination thereof of the first UE.

BRIEF DESCRIPTION OF THE DRAWINGS

FIGS. 16 through 18 show flowcharts illustrating methods that may support adaptive operational mode setting techniques for circuits presented herein, in accordance with aspects of the present disclosure.

DETAILED DESCRIPTION

Figure 1:
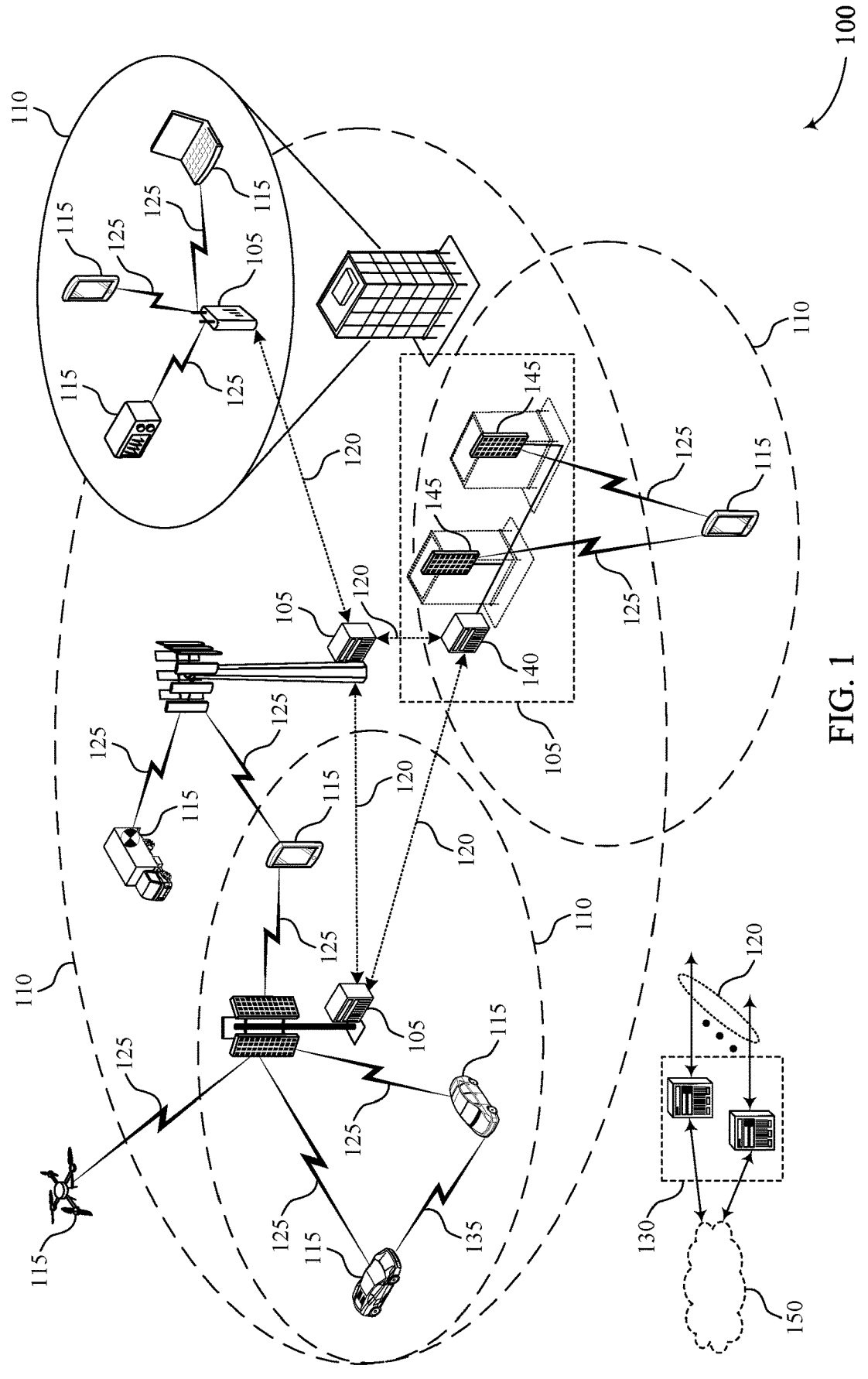
FIG. 1 illustrates an example of a system for wireless communications that may support adaptive operational mode setting techniques for circuits presented herein, in accordance with aspects of the present disclosure.

Wireless communication systems may include or support networks used for vehicle based communications, also referred to as vehicle-to-everything (V2X) networks, vehicle-to-vehicle (V2V) networks, cellular V2X (C-V2X) networks, or other similar networks. Vehicle based communication networks may provide always on telematics where UEs, e.g., vehicle UEs (v-UEs), communicate directly to the network (V2N), to pedestrian UEs (V2P), to infrastructure devices (V21), and to other v-UEs (e.g., via the network and/or directly). The vehicle based communication networks may support a safe, always-connected driving experience by providing intelligent connectivity where traffic signal/timing, real-time traffic and routing, safety alerts to pedestrians/bicyclist, collision avoidance information, etc., are exchanged. In some examples, communications in vehicle based networks may include safety message transmissions (e.g., basic safety message (BSM) transmissions, traffic information message (TIM), etc.).

C-V2X devices may experience power issues, thermal issues, and the like. For instance, C-V2X functionality may include always on applications (e.g., safety applications, etc.), that are not limited by battery constraints. Thus, V2X devices may experience high temperatures as a result of continual use. Power consumption and ambient temperatures may also affect operating temperatures of V2X devices. In such examples, power consumption (e.g., which may be affected by one or more parameters, such as voltage levels, clock frequency, and the like) may affect C-V2X procedures and devices under some thermal conditions. That is, if a V2X device is always on, always operating, experiencing excessive power consumption, operating in a high-temperature environment (e.g., in a vehicle), or any combination thereof, the V2X device may experience thermal issues.

In some examples, a V2X device may set an operational mode of a circuit by, for instance, selecting or adjusting one or more parameters (e.g., power levels, clock frequency, or the like) to avoid increased temperatures and the negative impact of high temperatures and resulting thermal issues. Power expenditures and resulting temperatures may be affected by a number of blind decodes a V2X device is configured to perform, or an amount of receive traffic the V2X device is expected to experience. Thus, a V2X device may select a parameter value (e.g., voltage level and clock frequency), for example based on a determination or a prediction of a number of blind decodes to be performed, a number of pending receive packets, or a number of transmitting UEs from which the V2X device will receive traffic. Having made such determinations or predictions, a V2X device may set voltage levels and clock frequencies accordingly. In some instances, setting voltage levels and clock frequencies based on a number of blind decodes to be performed may reduce unnecessary power expenditures and decrease temperature.

Particular aspects of the subject matter described herein may be implemented to realize one or more advantages. The described techniques may support improvements in system efficiency such that a device may avoid increased temperatures that lead to thermal issues such as hardware failure. The described techniques may thus support efficient power expenditure, decreased temperature, improved communication, increased system reliability, and improved consistency of applications including safety related applications, among other benefits.

Aspects of the disclosure are initially described in the context of wireless communications systems. Aspects of the disclosure are further illustrated by and described with reference to TTI structures, frequency resource configurations, process flows, monitoring schemes, and packet structures. Aspects of the disclosure are further illustrated by and described with reference to apparatus diagrams, system diagrams, and flowcharts that relate to adaptive operational mode setting for circuits.

FIG. 1 illustrates an example of a wireless communications system 100 that supports adaptive operational mode setting for circuits in accordance with aspects of the present disclosure. In some examples, adaptive operational mode setting for circuits may be performed by vehicle-to-everything (V2X) devices, vehicle-to-vehicle (V2V) devices, cellular V2X (C-V2X) devices, or the like. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, V2V communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a V2X device may select an operational mode of a circuit by selecting one or more adjustable parameter values (e.g., power level, clock frequency, or the like). In some cases, selecting the one or more parameter value may avoid increased temperatures and the negative impact of high temperatures and resulting thermal issues. Power expenditures and resulting temperatures may be affected by a number of blind decodes a V2X device is configured to perform, or an amount of receive traffic the V2X device is expected to experience. Thus, a V2X device may select a voltage level and clock frequency, for example based on a determination or a prediction of a number of blind decodes to be performed, a number of pending receive packets, or a number of transmitting UEs from which the V2X device will receive traffic. Having made such determinations or predictions, a V2X device may efficiently set an operational mode of a circuit. For instance, the V2X device may select one or more adjustable parameter values (e.g., voltage levels and clock frequencies). This may allow the V2X device to reduce unnecessary power expenditures and decrease temperature.

Figure 2:
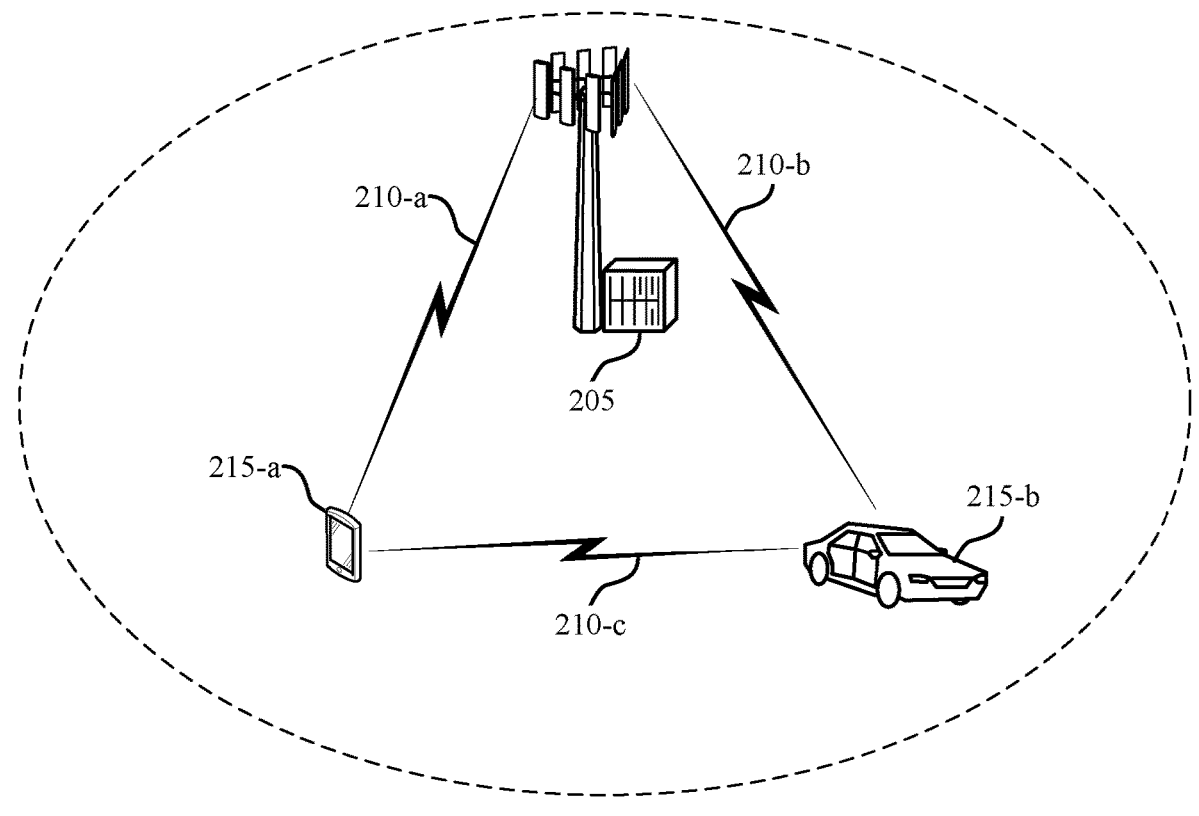
FIG. 2 illustrates an example of a wireless communications system that may support adaptive operational mode setting techniques for circuits presented herein, in accordance with aspects of the present disclosure.

FIG. 2 illustrates an example of a wireless communications system 200 that supports adaptive operational mode setting for circuits in accordance with aspects of the present disclosure. In some examples, adaptive operational mode setting for circuits may be performed by V2X devices, V2V devices, C-V2X devices, or the like. In some examples, wireless communications system 200 may implement aspects of wireless communication system 100. Wireless communications system 200 may include a base station 205, a UE 215-a, and a UE 215-b, which may be examples of corresponding devices described with reference to wireless communications system 100.

A base station 205 may communicate with one or more UEs 215. For instance, base station 205 may communicate with UE 215-a via a communication link 210-a, and may communicate with UE 215-b may communication link 210-b via communication link 210-b. In some examples, UE 215-b may be a V2X device for vehicle based communications. Wireless communications system 200 may be a V2X network, a V2V network, a C-V2X network, a sidelink network or another similar network. In some examples, UE 215-b may communicate with one or more additional UEs 215-*a* via communication link 210-*c*. Communication link 215-*c* may be a sidelink, which may support vehicle based communications. Vehicle based communication networks may provide always on telematics where UEs 215 (e.g., UE 215-*b*) communicate directly to the network, to infrastructure devices, and to other v-UEs 215 (e.g., UE 215-*a*), other non-vehicle UEs 215, or the like. The vehicle based communication networks may support a safe, always-connected driving experience by providing intelligent connectivity where traffic signal/timing, real-time traffic and routing, safety alerts to pedestrians/bicyclist, collision avoidance information, etc., are exchanged. In some examples, communications in vehicle based networks may include safety message transmissions (e.g., basic safety message (BSM) transmissions, traffic information message (TIM), etc.).

C-V2X devices may experience power issues, thermal issues, and the like. For instance, C-V2X functionality may include always on applications (e.g., safety applications, etc.), that are not limited by battery constraints. For instance, C-V2X systems may provide basic safety applications, advanced (e.g., platooning) applications, or the like. Because C-V2X services may be considered critical, C-V2X applications may be always on.

Additionally, C-V2X applications may not experience the same limitations as other applications. For instance, C-V2X functions may not be limited by car battery capacity. A mobile device, such as a smart phone (e.g., UE 215-*a*) may be limited by its battery capacity. However, in general, some C-V2X services may be active while a car ignition is on, and may thus not be limited by battery capacity or battery life. Thus, with respect to power consumption, battery aspects, etc., C-V2X may be free of battery capacity constraints.

However, V2X devices may experience high temperatures as a result of being always on, for example through continual use. High temperatures may result in damaged hardware, failed applications, system failure, efficiency degradation, or the like. Power consumption and ambient temperatures may also affect operating temperatures of V2X devices. In such examples, power consumption may affect C-V2X procedures and devices under some thermal conditions. An adjustable parameter of a circuit of a V2X device, such as voltage settings, clock frequency, and the like, may directly affect thermal conditions for UE 215-*b*. That is, if UE 215-*b* is always on or continuously operating C-V2X applications, experiencing excessive power consumption, operating in a high-temperature environment (e.g., in a vehicle), or any combination thereof, then UE 215-*b* may experience thermal issues. Thus, continuation of services in various thermal situations may be dependent on UE 215-*b* decreasing power consumption.

Efficiently selecting an operational mode of a circuit (e.g., by selecting one or more adjustable parameter values such as clock frequencies and voltage levels) may have a direct effect on power consumption and thermal control. The operational circuit of UE 215-*b* may include or be a modem, a transceiver or receiver (e.g., a hardware transceiver or receiver, or a software transceiver or receiver implemented at least in part in a processor), a processor, a memory, an integrated circuit, a circuit board, a system on a chip, or any combination thereof. In some examples, the circuit may be a portion (e.g., one or more components, blocks, modules, dies, etc.) of the modem, the transceiver or receiver, the processor, the memory, the integrated circuit, the circuit board, the system on a chip, or the combination thereof. To set the operational circuit by adjusting one or more parameters, a UE 215-*b* may increase the value of one or more adjustable parameters and decrease the value of other adjustable parameters, may increase the value of all adjustable parameters, decrease the value of all adjustable parameters, or any combination thereof. For instance, an unnecessarily high clock frequency, or voltage level, may increase power consumption and result in thermal issues. For instance, traffic at UE 215-*b* may be variable (e.g., change) over time. In such examples, adaptive parameter value selection may result in more efficient power expenditures. However, C-V2X systems may not benefit from conventional techniques. For instance, C-V2X systems may not utilize idle mode, or cellular DRX procedures (e.g., as a result of the always-on functionality of some C-V2X applications). In some examples, a C-V2X device (e.g., UE 215-*b*) may proceed with blind decoding attempts of all available control channels (e.g., to receive any pending receive traffic, which may include emergency or essential services). In some examples, base station 205 may configure UE 215-*b* to blind decode a large number of control channel candidates (e.g., up to twenty control channel candidates). However, over time, configurations may change, resulting in an increase or decrease of the number of blind decodes and a corresponding power expenditure. UE 215-*b* may adaptively set voltage levels and clock frequencies. In some instances, adaptively setting voltage levels and clock frequencies may result in a decrease in power expenditures and avoidance of thermal issues. This may allow a UE 215-*b* to avoid unnecessary power expenditures (e.g., if less blind decodes are configured, if less traffic is occurring, or the like). In some examples, clock frequency and voltage levels may be bandwidth dependent. For example, a UE 215-*b* may select a voltage level and clock frequency based on whether it is operating in a 10 MHz band or a 20 MHz band. However, in some cases, a bandwidth dependent scheme may be less efficient (e.g., may conserve less power and reduce temperature less) than an adaptive scheme based on blind decodes, pending traffic, or the like.

In some examples, a V2X device may select an operational mode of a circuit by selection an adjustable parameter value (e.g., a voltage level, a clock frequency, or both) based on a resource configuration. For instance, UE 215-*b* may select adjustable parameter values (e.g., voltage level, or clock frequency, or both) based on a frequency resource configuration for an operating bandwidth. In such examples, UE 215-*b* may select a voltage level and clock frequency for its modem or a portion of its modem (e.g., a portion of a transmitter component or a portion of a receiver component) based on the frequency resource configuration. The frequency resource configuration may include a number of subchannels within the operating bandwidth, a size of subchannels within the bandwidth, a number of physical resource blocks per bandwidth, a subcarrier spacing, a number of blind decode procedures to be performed over the operating bandwidth, or any combination thereof. Selecting a voltage level and a clock frequency based on a frequency resource configuration is described in greater detail with reference to FIGS. 3-6.

In some examples, a V2X device may select a parameter value (e.g., a voltage level, a clock frequency, or both) based on an estimated number of UEs 215 that will generate traffic for the V2X device. For instance, UE 215-*b* may estimate a number of UEs 215 that will send receive traffic for UE 215-*b*. The estimation maybe based on, for example, device identifiers (e.g., layer-2 identifiers). Having identified a number of other UEs 215, UE 215-*b* may select a voltage level and a clock frequency that correspond with the estimated number of other UEs 215. Selecting a voltage level and clock frequency based on an estimated number of UEs 215 that will generate traffic for the V2X device is described in greater detail with reference to FIGS. 7-9.

In some examples, a V2X device may select one or more parameter value (e.g., a voltage level, a clock frequency, or both) based on an estimated number of receive packets per transmission time interval (TTI) (e.g., a slot, a subframe, etc.). For instance, UE 215-*b* may observe, over a time duration (e.g., a number of TTIs), an amount of receive traffic. UE 215-*b* may determine an amount of receive traffic per time duration, or may determine an average number of receive packets per TTI, or the like. Based on this determination, UE 215-*b* may predict an amount of pending receive traffic in a subsequent time duration, and may select a corresponding voltage level and clock frequency for the subsequent time duration. Selecting a voltage level and clock frequency based on an estimated number of receive packets per TTI is described in greater detail with reference to FIGS. 10-11.

In some instances, as described herein, a UE 215-*b* may set an operational mode of a circuit of the UE 215-*b* (e.g., by adjusting one or more parameters, such as clock frequency, voltage level, or the like). In some examples, setting an operational mode of the circuit may include one or more parameters being increased while one or more other parameters may be decreased. For example, a clock frequency may be decreased while a voltage level is increased or remains constant. In another example, the voltage level may be decreased while a clock frequency is decreased or remains constant. Setting the operational mode by adjusting one or more parameters may result in decreased temperatures during operation, decreased power expenditures, improved system efficiency, avoided thermal issues (e.g., hardware failure), increased effectiveness of safety procedures and other C-V2X applications, and improved user experience. In some examples, adjustable parameters may be applied to one or more components of the circuit of the UE 215-*b*. For example, the circuit may be a modem, or a portion of the modem (e.g., a transmitter component of the modem, a receiver component of the modem, or the like). The circuit may be a transceiver, a processor, memory, an integrated circuit, a circuit board, or some combination thereof of the first UE. The circuit may include a chip, a portion of a portion of a chip, a chip assembled into a device such as a vehicle based communication device, a component of chip, or the like. Some parts of the circuit may remain at an initial parameter value (e.g., a baseline parameter value), while the UE 215-*b* may adjust or update adjustable parameters based on resource configurations (e.g., frequency resources, time resources, spatial resources, or the like), identified number of UEs, identified number of expected receive packets, or the like.

Figure 3:
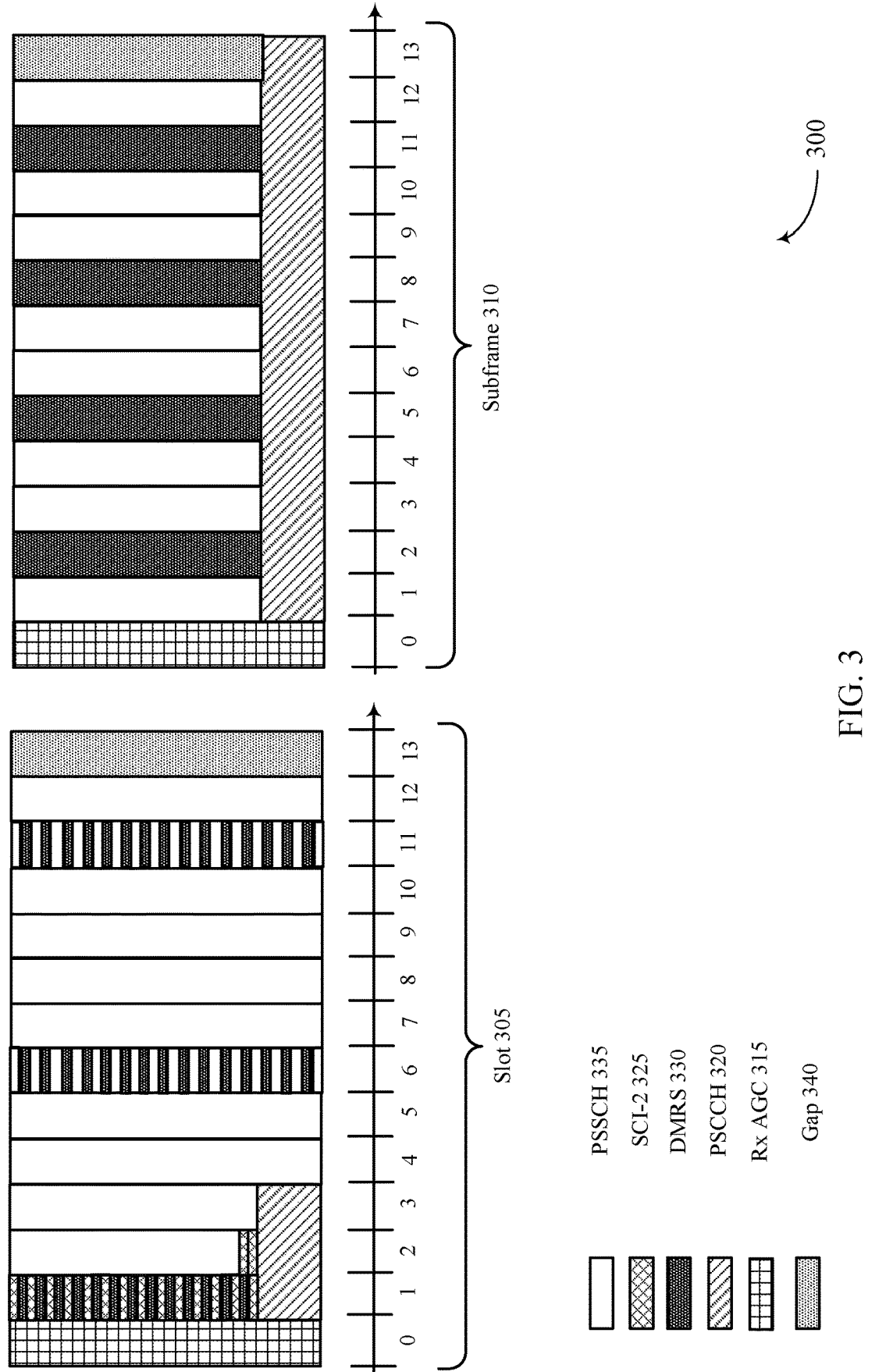
FIG. 3 illustrates an example of a transmission time interval (TTI) structure that may support adaptive operational mode setting techniques for circuits presented herein, in accordance with aspects of the present disclosure.

FIG. 3 illustrates an example of a TTI structure 300 that supports adaptive operational mode setting for circuits and power saving in accordance with aspects of the present disclosure. In some examples, adaptive operational mode setting for circuits may be performed by V2X devices, V2V devices, C-V2X devices, or the like. In some examples, TTI structure 300 may implement aspects of wireless communication system 100. In some examples, TTI structure 300 may be utilized by a base station 105 or a base station 205, or a UE 115 or a UE 215, or any combination thereof, as described with reference to FIGS. 1 and 2.

C-V2X systems may be receive-heavy (e.g., may expend a higher portion of power on receiving procedures than transmitting procedures). In some examples, a C-V2X device (e.g., a UE) may receive a large number of transmissions, but may transmit infrequently. Thus, a UE may perform blind decoding on packets (e.g., physical sidelink control channel (PSCCH) packets) during each TTI (e.g., during each subframe, or during each slot of a frequency resource configuration). Regardless of the system in which the UE operates, the UE may attempt to perform blind decoding of PSCCHs first. If PSCCH blind decoding procedures are successful, then physical sidelink shared channel (PSSCH) decoding may be performed.

For example, the UE may receive signaling during a slot 305. Slot 305 may be, for instance, a 5G NR slot and may be structured according to a C-V2X PSSCH slot structure. Slot 305 may include a symbol (e.g., symbol 0) for automatic gain control (AGC), and may include PSCCH for first stage sidelink control information (SCI-1) 320 (e.g., in symbols 1-3), second stage SCI (SCI-2) 325 (e.g., in symbol 2), DMRS 330 (e.g., interleaved with SCI-2 in symbol 1, and interleaved with PSSCH 335 in symbols 6 and 11), PSSCH 335 (e.g., in symbols 2-5, 7-10, and 12, and interleaved with DMRSs 330 in symbols 6 and 11), and a gap 340 (e.g., in symbol 13).

In some examples, the UE may receive signaling during a subframe 310. Subframe 310 may be, for instance, a 4G LTE slot. Slot 310 maybe structured according to a 4G LTE C-V2X PSSCH subframe structure. Subframe 310 may include a slot (e.g., slot 0) for AGC, and may include PSCCH 320 (e.g., across a portion of slots 1-13), PSSCH 335 (e.g., across a remaining portion of slots 1, 3-4, 6-7, 9-10, and 12), and DMRSs 330 (e.g., across a remaining portion of slots 2, 5, 8, and 11), and a gap 340 (e.g., in a remaining portion of slot 13).

In any case, (e.g., an a 5G NR system, a 4G LTE system, or the like), C-V2X reception power expenditure may be higher than C-V2X transmission power expenditure. In some examples, reception power expenditure may be up to five times higher than transmission power expenditure. For instance, a UE may perform about thirty-million cycles for transmission procedures, and may perform about 150 million cycles for reception procedures. It may therefore be beneficial to determine a number of blind decodes to be performed by the UE as part of a reception procedure, and set a parameter value (e.g., a voltage level, a clock frequency, or both) based thereon. In such cases, for fewer blind decodes, a UE may reduce its voltage level and clock frequency, reducing power expenditures and avoiding thermal issues at the modem of the UE. The clock frequency and voltage level may be set based on a resource configuration, as described in greater detail with reference to FIG. 4.

Figure 4:
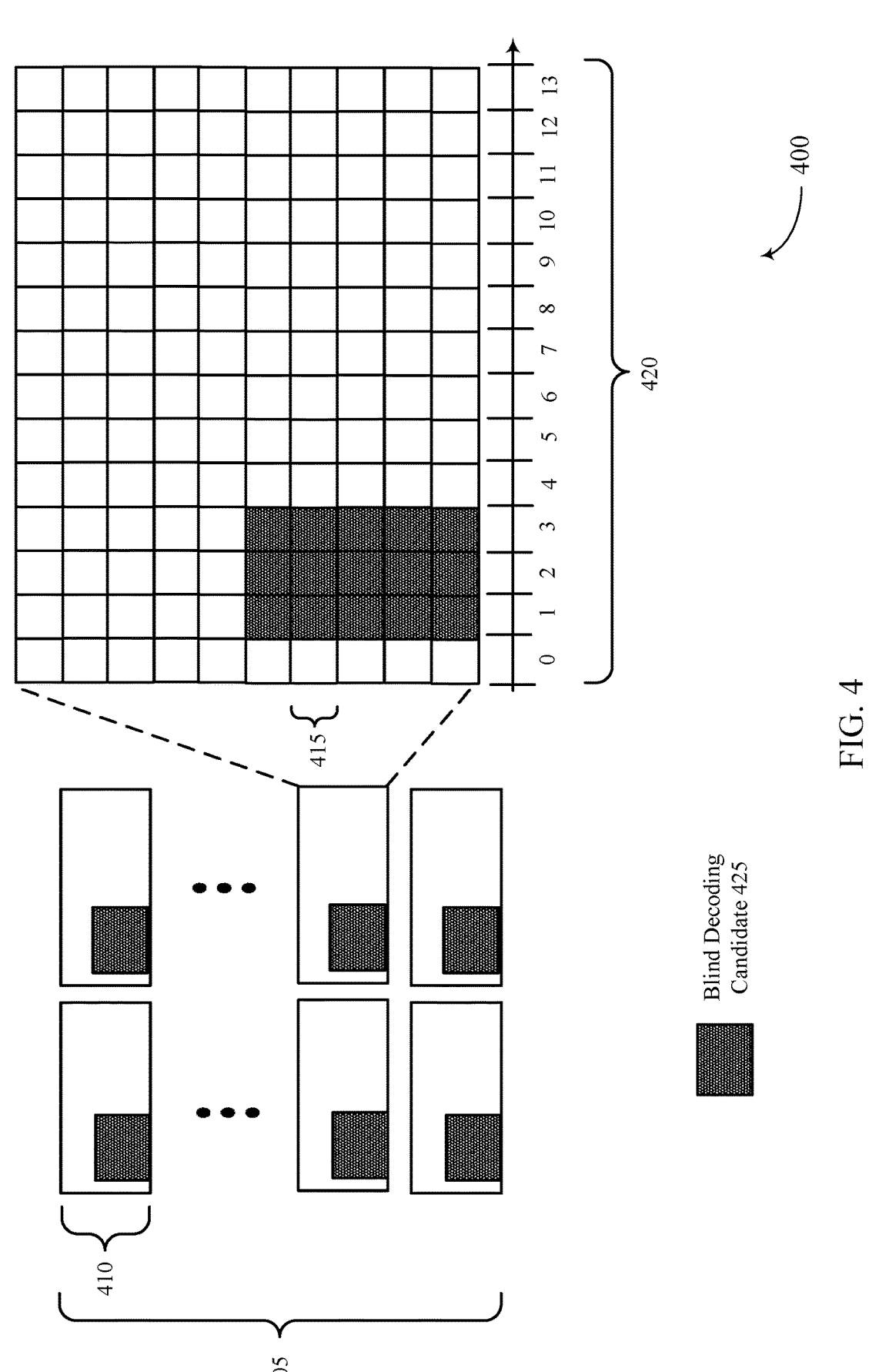
FIG. 4 illustrates an example of a frequency resource configuration that may support adaptive operational mode setting techniques for circuits presented herein, in accordance with aspects of the present disclosure.

FIG. 4 illustrates an example of a resource configuration 400 that supports adaptive operational mode setting for circuits in accordance with aspects of the present disclosure. In some examples, adaptive operational mode setting for circuits may be performed by V2X devices, V2V devices, C-V2X devices, or the like. In some examples, resource configuration 400 may implement aspects of wireless communication system 100.

A frequency bandwidth 405 may include a number of subchannels 410. Each subchannel 410 may include a blind decoding candidate 425. Each subchannel 410 may be defined by a number of resource blocks (RBs) 415. Each subchannel of the frequency band may span one or more slots (e.g., in a 5G NR system) including a number of symbols (e.g., 14 symbols) or subframes (e.g., in a 4G LTE system) including a number of slots (e.g., 14 slots). A blind decoding candidate 425 spanning a number of TTIs (e.g., a number of slots or a number of subframes) and a number of RBs 415. A size of a subchannel 410 maybe defined by a number of RBs 415.

In some examples, a minimum parameter value (e.g., a minimum required clock frequency, minimum required voltage level, or both) may depend on a number of required blind decoding attempts a UE must perform based on a resource configuration, or based on a number of subchannels in which blind decoding candidates 425 are located within bandwidth 405, or the like. As described in greater detail with reference to FIG. 5, a UE may determine a number of blind decoding candidates 425, a number of subchannels 410, a size (e.g., number of RBs) of subchannels 410, or the like, and may set voltage levels and clock frequencies based thereon.

Figure 5:
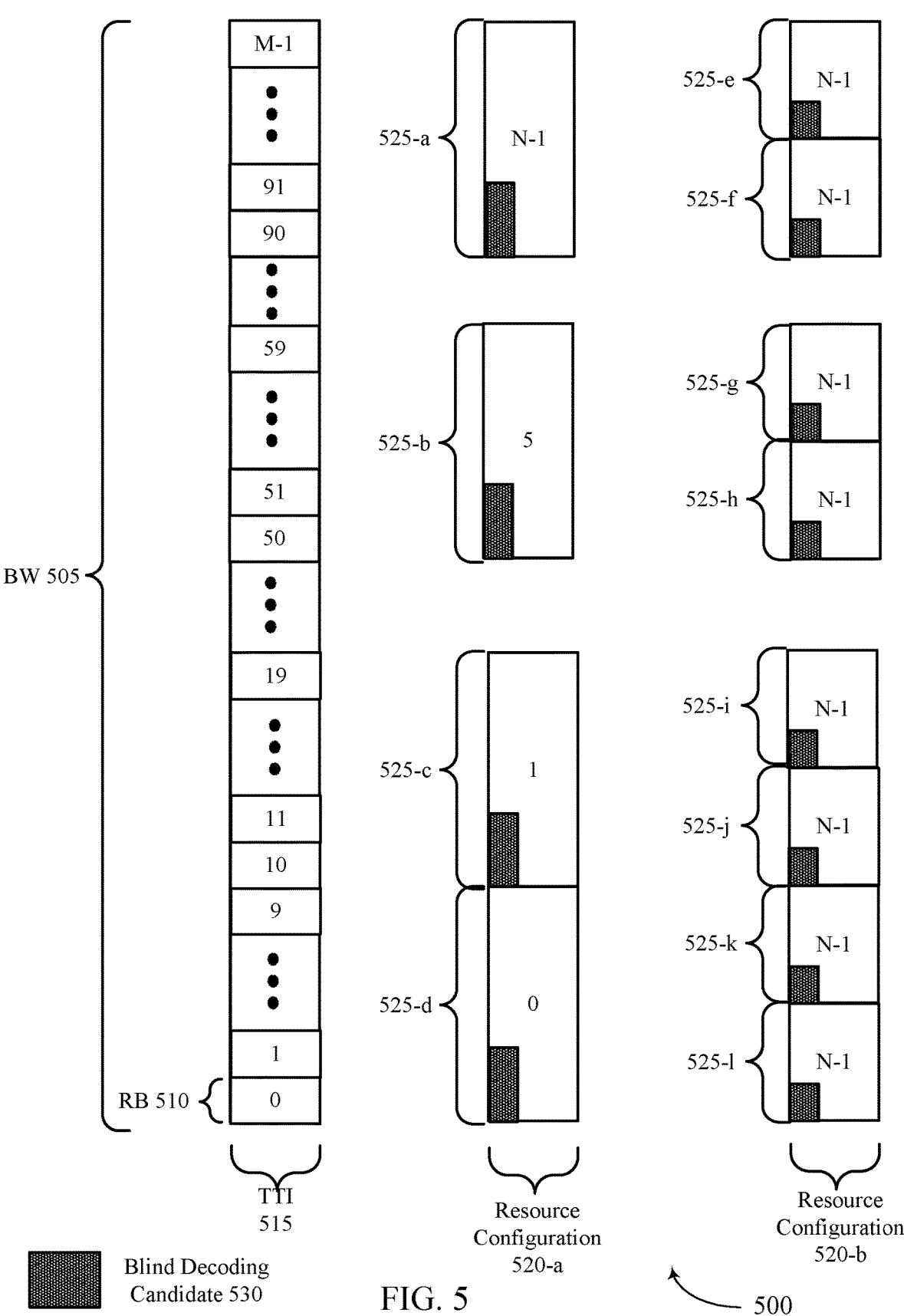
FIG. 5 illustrates an example of a frequency resource configuration that may support adaptive operational mode setting techniques for circuits presented herein, in accordance with aspects of the present disclosure.

FIG. 5 illustrates an example of a resource configuration 500 that supports adaptive operational mode setting for circuits in accordance with aspects of the present disclosure. In some examples, adaptive operational mode setting for circuits may be performed by V2X devices, V2V devices, C-V2X devices, or the like. In some examples, resource configuration 500 may implement aspects of wireless communication system 100.

A bandwidth 505 may include a number (M) of RBs 510. Each RB 510 may include 12 resource elements (REs). Bandwidth 505 may span, for instance, 10 MHz, or 20 MHz. Subchannels 525 may have a configurable size (e.g., a configurable number of RBs 510 for a TTI 515 (e.g., a slot or a subframe), which may change over time as resources are configured by a base station. Packet allocation may be based on subchannel 525 size. Each subchannel 525 may include a number of RBs 510. Each subchannel 525 may also include a blind decoding candidate 530 on which a UE may attempt to receive control information on a PSSCH.

Power expenditure by a UE (and one or more parameter values such as clock frequency and voltage levels) may be limited by a number of configured subchannels 525 (e.g., and a maximum number of blind decodes to be performed by the UE). In some examples, clock frequency settings, or voltage level settings, or both, may be based on a number of blind decodes to be performed on each subchannel 525. A number of actually allocated packets per TTI may have a secondary impact on power expenditures, but total number of configured subbands 525 may be an upper boundary on power expenditures. Thus, a UE may use the number of subchannels 525 in a bandwidth 505 to determine clock frequency and voltage setting.

In a first resource configuration 520-a, subchannels 525 may be larger than subchannels 525 in second resource configuration 520-b. For example, in resource configuration 520-a, subchannels 525 may have a size of ten RBs 510. Thus, each of subchannel 525-a, subchannel 525-b, subchannel 525-c, and subchannel 525-d may have a subchannel size of ten RBs 510. Each subchannel 525 may include a blind decoding candidate 530. Thus, for a bandwidth 505 spanning M=100 RBs 510, resource configuration 520-a may include ten subchannels 525 and ten blind decoding candidates 530.

In second resource configuration 520-b, subchannels 525 may be smaller than subchannels 525 in first resource configuration 520-a. For example, in resource configuration 520-b, subchannels 525 may have a size of five RBs 510. Thus, each of subchannels subchannel 525-e, subchannel 525-f, subchannel 525-g, subchannel 525-h, subchannel 525-i, subchannel 525-j, subchannel 525-k, and subchannel 525-1 may have a subchannel size of five RBs 510. Each subchannel 525 may include a blind decoding candidate 530. Thus, for a bandwidth 505 spanning M=100 RBs 510, resource configuration 520-b may include twenty subchannels 525 and twenty blind decoding candidates 530.

A UE may select one or more parameter values (e.g., a clock frequency, a voltage level, or both) based on a resource configuration 520. For example, because resource configuration 520-b includes twenty subchannels 525 and resource configuration 520-a includes ten subchannels 525, resource configuration 520-b may have a higher maximum power expenditure than resource configuration 520-a. Thus, a UE may select a higher voltage level and higher clock frequency for resource configuration 520-b than for resource configuration 520-a. A number of subchannels in a 4G LTE system or a 5G NR system for C-V2X may depend on the size of bandwidth 505, the size of subchannels 525, subcarrier spacing for bandwidth 505, or the like. For instance, in an NR 5G system, in practice, bandwidth 505 may be 10 MHz, 20 MHz, 40 MHz, or 50 MHz. Subchannel size may be 10 RBs 510, 15 RBs 510, 20 RBs 510, 25 RBs 510, 50 RBs 510, 75 RBs 510, or 100 RBs 510. Bandwidth 505 may be configured with a subcarrier spacing of 15 kHz, 30 kHz, 60 kHz, and 120 kHz. A UE may set its clock frequency and voltage level based on a resource configuration (e.g., a number of subchannels 525). For example, for a resource configuration 520 with twenty subchannels, the UE may expend a higher amount of power, while for a resource configuration with one subchannel, the UE may expend a lower amount of power. Bandwidth values (e.g., a bandwidth 505 of 10 MHz or 20 MHz) may not have a large impact on power expenditures. In some examples, the UE may be preconfigured with a number of subchannels. In some examples, a base station may configure the number of subchannels. For instance, the base station may configure the number of subchannels via system information block (SIB) signaling, radio resource control (RRC) signaling, or a combination.

In some examples, depending on a number of configured subchannels (e.g., as configured by a numSubchannel indication by a base station), the UE may select a parameter value (e.g., a clock frequency, a voltage level, or both). For instance, the UE may determine a number of threshold values (e.g., ranges of configured numbers of subchannels, or the like), and may determine which threshold values are satisfied by the configured number of subchannels. For instance, if a configured number of subchannels does not satisfy a first threshold value (e.g., is less than the threshold), then the UE may select a first (e.g., lowest) clock frequency, voltage level, or both, that is associated with the first threshold. If the configured number of subchannels does satisfy the first threshold value (e.g., is greater than or equal to the threshold) but does not satisfy a second higher threshold value (e.g., is less than the second threshold), then the UE may select a second (e.g., higher) clock frequency or voltage level associated with the second threshold. In some examples, the UE may identify a lookup table, and may identify an entry in the lookup table associated with the number of configured subchannels. The UE may then identify a clock frequency and a voltage level in the lookup table associated with the number of configured subchannels. In such examples, the UE may select the identified clock frequency and voltage levels, and may communicate using the selected clock frequency and voltage levels, as described with reference to FIG. 6.

In some examples, the UE may set an initial parameter value (e.g., a clock frequency, a voltage level, or both) based on the number of configured subchannels. After performing blind decoding for PSSCH on the configured subchannels using the initial clock frequency and power level, the UE may adjust the clock frequency and power level based on a number of successfully decoded PSCCH or PSSCH decoding. For instance, if the UE performs less PSSCH decoding than predicted, the UE may decrease the clock frequency and voltage levels.

Figure 6:
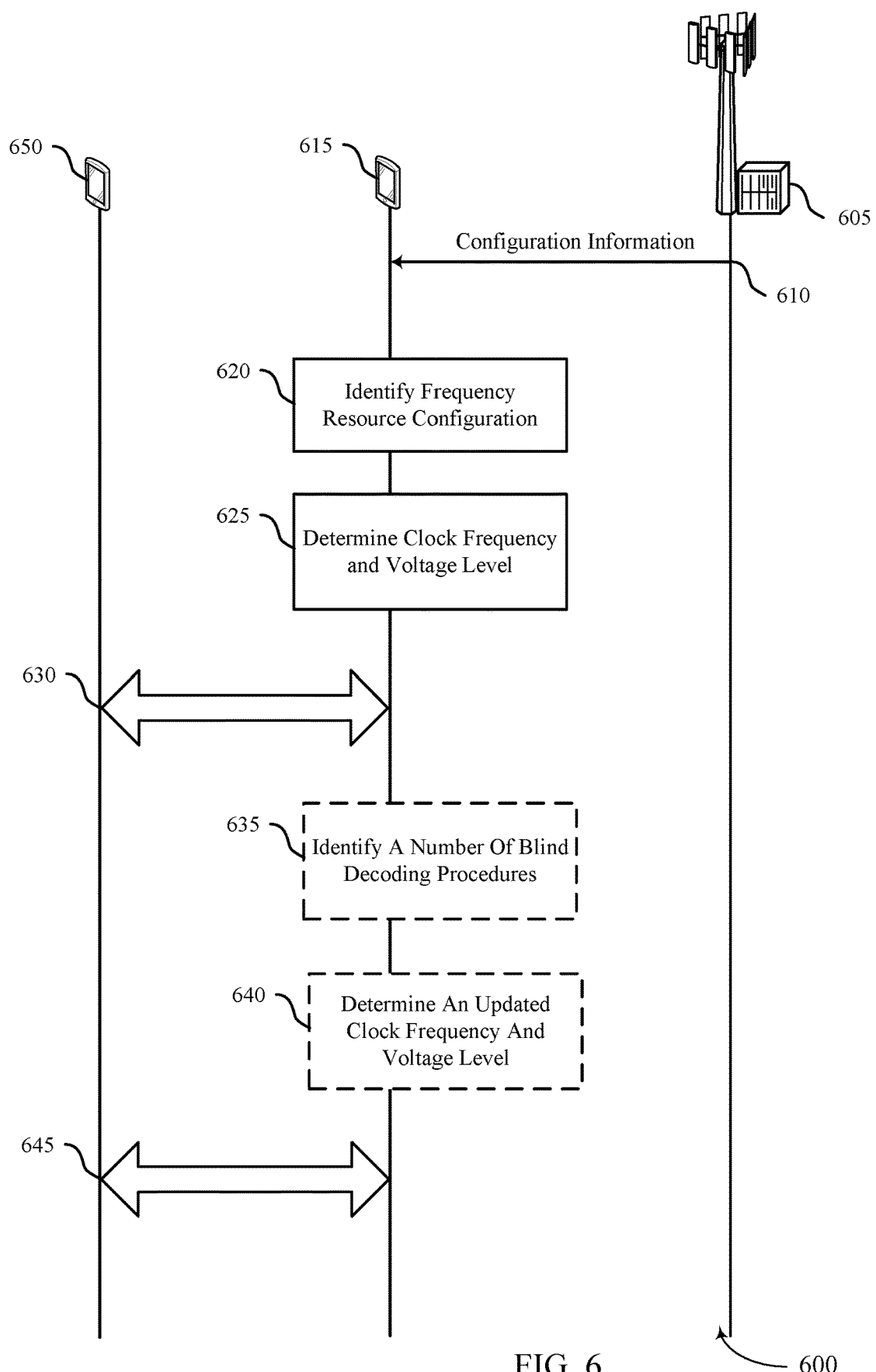
FIG. 6 illustrates an example of a process flow that may support adaptive operational mode setting techniques for circuits presented herein, in accordance with aspects of the present disclosure.

FIG. 6 illustrates an example of a process flow 600 that supports adaptive operational mode setting for circuits in accordance with aspects of the present disclosure. In some examples, adaptive operational mode setting for circuits may be performed by V2X devices, V2V devices, C-V2X devices, or the like. In some examples, process flow 600 may implement aspects of wireless communication system 100. In some examples, process flow 600 may include a base station 605, a UE 615, and one or more UEs 650. UEs 615 and 650 may be V2X devices, both base station 605 and UEs 615 and 650 may be examples of corresponding devices described with reference to FIGS. 1 and 2.

At 610, base station may transmit configuration information to UE 615. The configuration information may include information indicating a resource configuration (e.g., a frequency resource configuration). The configuration information may include a radio resource control message, a system information block message, or a combination thereof. In some examples, the frequency resource configuration may be preconfigured at UE 615 (e.g., instead of signaled at 610).

At 620, UE 615 may identify a frequency resource configuration. For example, UE 615 may identify the frequency resource configuration indicated at 610. The frequency resource configuration may be for an operating bandwidth of a sidelink wireless connection for communicating with one or more UEs. For example, UE 615 may identify a number of subchannels within the operating bandwidth, a size of subchannels within the bandwidth, a number of physical resource blocks per bandwidth, a subcarrier spacing, or a combination thereof.

At 625, UE 615 may determine one or more parameter values (e.g., a clock frequency, a voltage level, or both) for UE 615. For example, UE 615 may identify a first threshold frequency resource configuration associated with the clock frequency and the voltage level and a second threshold frequency resource configuration associated with a second clock frequency and a second voltage level. UE 615 may determine determining that the frequency resource configuration satisfies the first threshold frequency resource configuration, and may select the clock frequency and the voltage level based at least in part on determining that the frequency resource configuration satisfies the first threshold frequency resource configuration. In some examples, UE 615 may determine that the frequency resource configuration fails to satisfy the second threshold frequency resource configuration, the clock frequency and the voltage level selected further based at least in part on determining that the frequency resource configuration fails to satisfy the second threshold frequency resource configuration.

In some examples, the clock frequency and voltage level for UE 615 may include the clock frequency and voltage level for a modem of UE 615, the modem of UE 615 configured to operate according to a plurality of different clock frequencies or a plurality of different voltage levels, or both, based at least in part on the frequency resource configuration for UE 615. The clock frequency and voltage level for the modem of UE 615 may include the clock frequency and voltage level for at least a portion of a receiver component of the modem or at least a portion of a transmitter component of the modem, or both.

In some examples, UE 615 may identify the operating bandwidth for UE 615 from a set of bandwidths, and may determine the clock frequency and the voltage level for UE

615 based at least in part on the identified frequency resource configuration and the operating bandwidth.

At 630, UE 615 may communicate with one or more UEs 650 on the sidelink wireless connection using the frequency resource configuration according to the determined clock frequency and voltage level.

In some examples, at 635, UE 615 may identify a number of blind decoding procedures performed on the frequency resource configuration using the clock frequency and the voltage level.

At 640, UE 615 may determine an updated clock frequency and voltage level for UE 615, based on the number of blind decoding procedures performed.

AT 645, UE 615 may communicate with one or more UEs 650 using the updated clock frequency and the updated voltage level.

Figure 7:
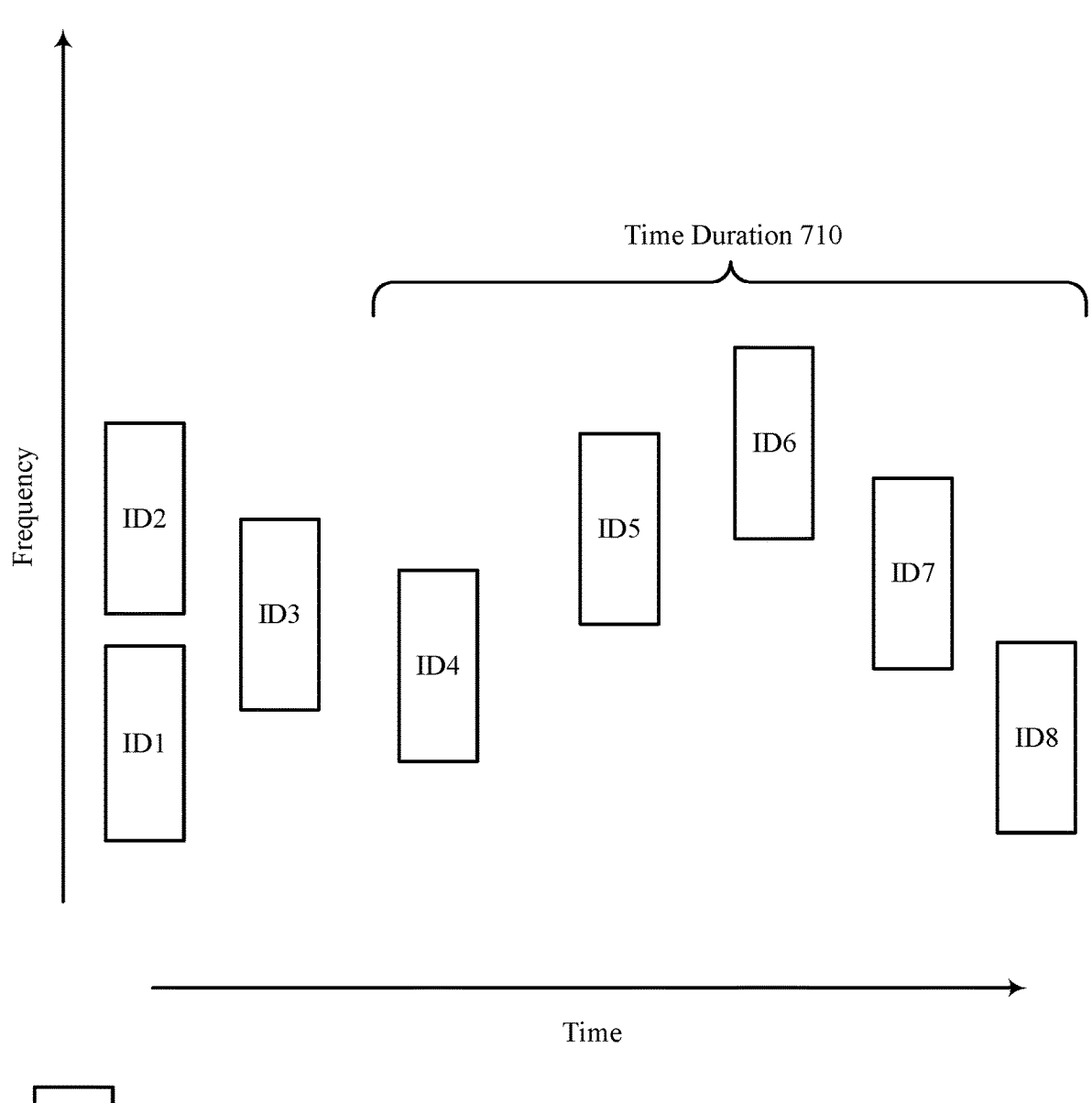
FIG. 7 illustrates an example of a monitoring scheme that may support adaptive operational mode setting techniques for circuits presented herein, in accordance with aspects of the present disclosure.

FIG. 7 illustrates an example of a monitoring scheme 700 that supports adaptive operational mode setting for circuits in accordance with aspects of the present disclosure. In some examples, adaptive operational mode setting for circuits may be performed by V2X devices, V2V devices, C-V2X devices, or the like. In some examples, monitoring scheme 700 may implement aspects of wireless communication system 100. In some examples, a UE 115 or a UE 215 as described with reference to FIGS. 1 and 2 may implement aspects of monitoring scheme 700.

In some examples, a UE may select one or more parameter values (e.g., a clock frequency, a voltage level, or both) based on a number of currently generating or expected to generate receive traffic. A UE may estimate a number of UEs expected to generate receive traffic, or may estimate an expected number of receive packets per slot or subframe. Clock frequency and voltage level setting may consider an expected number of receive packets per slot or subframe. However, expected number of receive packets may be driven by a number of UEs generating receive traffic. Thus, the UE may determine a number of UEs expected to generate receive traffic, and may select a voltage level and clock frequency based thereon.

A UE may estimate a number of UEs expected to generate receive data based on device identifiers. For example, the UE may rely on source layer-2 identifiers. C-V2X packets may include such source layer-2 identifiers, as described in greater detail with reference to FIG. 8. By considering a number of unique source layer-2 identifiers observed in a previous time window, a UE may estimate receive traffic. For instance, the UE may receive or monitor for multiple packets 705. Packets 705 may be data packets, or other packets, transmitted by other UEs (e.g., other sidelink UEs, V2X devices, or the like). In some examples, some signals from the other UEs may include a MAC header, including a device identifier, as described with reference to FIG. 8. The UE may monitor for packets 705 to identify unique device identifiers during a time duration 710. For instance, during time duration 710, the UE may identify five unique IDs (e.g., ID4-ID8). The UE may estimate that during a subsequent time duration 710 (e.g., a current time duration 710), the UE will receive about five data packets from five different UEs. Or, if time duration 710 spans ten TTIs, then the UE may estimate that during a subsequent time duration 710, the UE will receive about one data packet from a UE every two TTIs. Based on the estimation, the UE may set its parameter value (e.g., clock frequency, voltage level, or the like) for the subsequent time duration 710. In some examples, the UE may only consider unique device identifiers. Thus, if ID 4 and ID 8 are identical (e.g., correspond to the same device), then the UE may only count four device identifiers as having been received during time duration 710.

The UE may select one or more parameter values (e.g., a clock frequency, a voltage level, or the like) based on the estimated number of UEs that will generate receive traffic. For instance, the UE may determine a number of threshold values (e.g., representing ranges of estimated numbers of UEs), and may determine which threshold values are satisfied by the estimated number of UEs. For instance, if an estimated number of UEs does not satisfy a first threshold value (e.g., is less than the threshold), then the UE may select a first (e.g., lowest) clock frequency, voltage level, or both, that is associated with the first threshold. If the estimated number of UEs does satisfy the first threshold value (e.g., is greater than or equal to the threshold) but does not satisfy a second higher threshold value (e.g., is less than the second threshold), then the UE may select a second (e.g., higher) clock frequency or voltage level associated with the second threshold. In some examples, the UE may identify a lookup table, and may identify an entry in the lookup table associated with the estimated number of UEs. The UE may then identify a clock frequency and a voltage level in the lookup table associated with the estimated number of UEs. In such examples, the UE may select the identified clock frequency and voltage levels, and may communicate using the selected clock frequency and voltage levels, as described with reference to FIG. 9.

In some examples, for a congestion level estimation (e.g., an estimated number of UEs expected to generate receive traffic for a parameter value such as a clock setting), the UE may determine a channel busy time ratio. In some examples, the UE may consider a channel busy time ratio alone, or a channel busy time in combination with the estimated number of UEs, to determine a clock frequency or voltage setting, or both. A higher channel busy time ratio may result in the UE selecting a higher clock frequency and voltage level, while a lower channel busy time ratio may result in the UE selecting a lower clock frequency and voltage level.

In some examples, the UE may consider one or more parameters in selecting the length of time duration 710. For instance, the UE may consider its movement or its speed in determining the length of time duration 710. If the UE is moving at a high speed, then the number of other UEs that might generate traffic may change rapidly (e.g., as the other UEs physically located close to the UE may change quickly over time as the UE travels). Thus, if the UE is moving at a high speed, then the UE may select a short time duration 710. If the UE is moving at a lower speed or is stationary, then the UE may select a longer time duration 710. Thus, the UE may select voltage levels or clock frequency based on whether it is moving faster, slower, is changing directions, has recently stopped, has recently begun to move, or the like. For estimating the number of other UEs that will generate traffic during time duration 710, the UE may use any statistical method (e.g., simple linear averaging, non-linear statistical methods, or the like).

Figure 8:
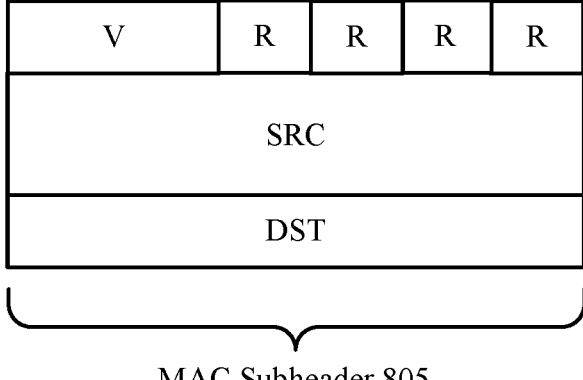
FIG. 8 illustrates an example of a packet structure that may support adaptive operational mode setting techniques for circuits presented herein, in accordance with aspects of the present disclosure.

FIG. 8 illustrates an example of a packet structure 800 that supports adaptive operational mode setting for circuits in accordance with aspects of the present disclosure. In some examples, adaptive operational mode setting for circuits may be performed by V2X devices, V2V devices, C-V2X devices, or the like. In some examples, packet structure 800 may implement aspects of wireless communication system 100.

In some examples, a sidelink UE may transmit one or more packets. A MAC PDU may include a MAC header. A MAC packet data unit may include a MAC header, one or more MAC service data units (MAC SDUs), and optional padding. A MAC header may include a MAC subheader 805. MAC subheader 805 may include seven header fields. For instance, MAC subheader 805 may include a V field, which may be a one-bit field to indicate if a power headroom value is based on a real transmission a reference format. MAC subheader 805 may also include four R fields, each of which may be reserved bits (e.g., set to zero). MAC subheader 805 may also include a source (SRC) field, and a destination (DST) field. The source field may include a layer-2 indicator unique to the transmitting UE.

Thus, a V2X UE may monitor sidelink resources for data packets, and identify (e.g., in a SRC field of a MAC subheader 805 of a MAC header in a MAC PDU) a unique device identifier for the source device that transmitted the data packet. The V2X UE may thus identify a number of unique UEs that may generate traffic, based on the MAC subheader 805, as described in greater detail with reference to FIG. 7.

Figure 9:
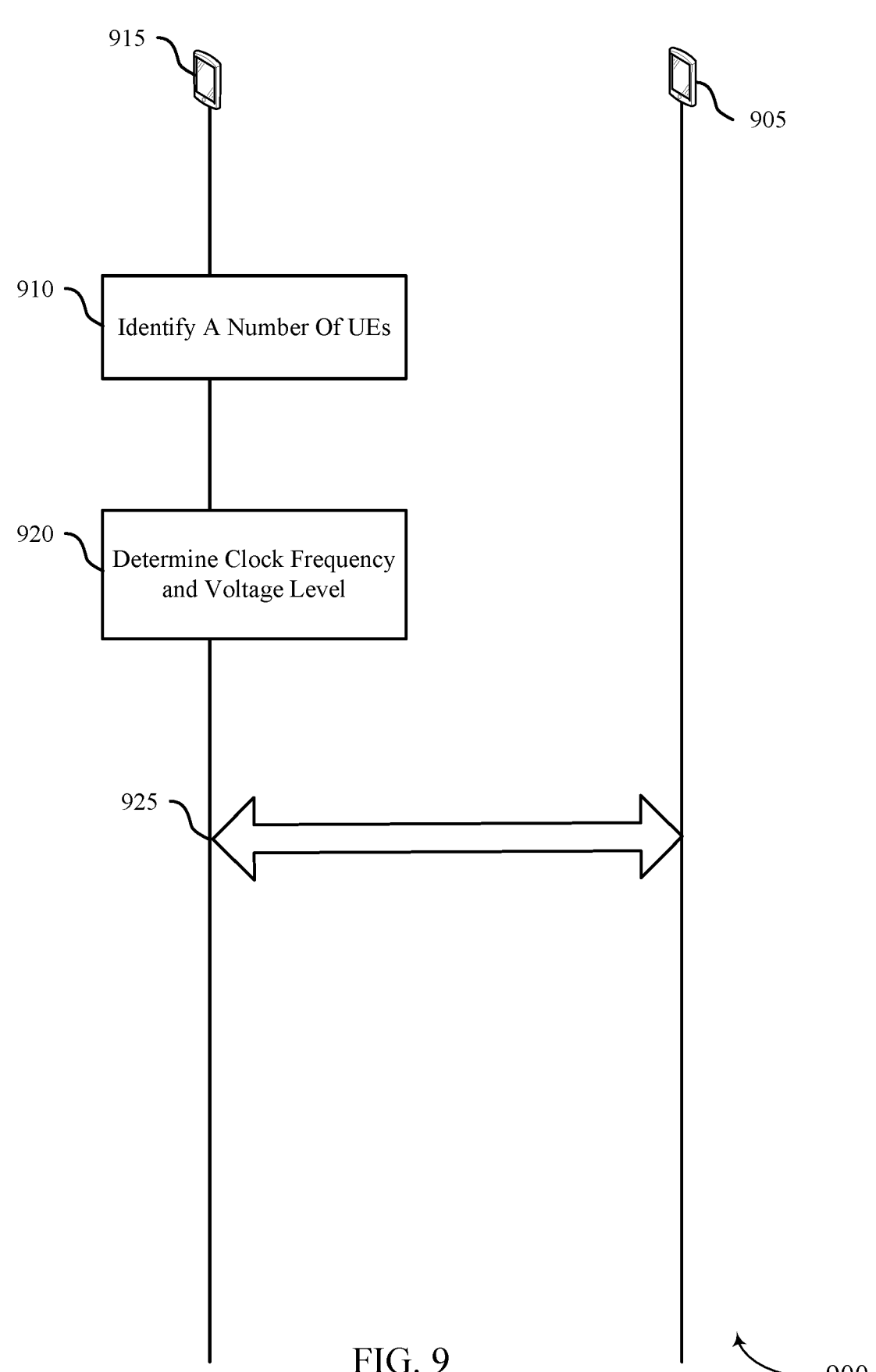
FIG. 9 illustrates an example of a process flow that may support adaptive operational mode setting techniques for circuits presented herein, in accordance with aspects of the present disclosure.

FIG. 9 illustrates an example of a process flow 900 that supports adaptive operational mode setting for circuits in accordance with aspects of the present disclosure. In some examples, process flow 900 may implement aspects of wireless communication system 100. Process flow 900 may include a one or more UEs 905 and a UE 915, which may be an example of a V2X device. UEs 905 and UE 915 may be examples of corresponding devices as described with reference to FIGS. 1, 2, and 6.

At 910, UE 915 may identify a number of UEs configured to communicate with the UE 915 on a sidelink wireless connection. For example, UE 915 may identify a set of device identifiers associated with respective UEs of the number of UEs. UE 915 may identify a second number of UEs that communicate with the UE 915 in a first time duration, observation window, or TTI. UE 915 may also determine, based on the second number of UEs, the number of UEs configured to communicate with UE 915 in a second time duration, observation window, or TTI. The duration of the first TTI or the first observation window or time duration, or the like, may be based at least in part on a movement or speed of UE 915.

At 920, UE 915 may determine one or more parameters (e.g., a clock frequency, a voltage level, or both) for UE 915 based at least in part on the identified number of UEs. For example, UE 915 may identify a first threshold number of UEs associated with the clock frequency and the voltage level and a second threshold number of UEs associated with a second clock frequency and a second voltage level. UE 915 may determine that the identified number of UEs satisfies the first threshold number of UEs, and may select the clock frequency and the voltage level based at least in part on determining that the identified number of UEs satisfies the first threshold number of UEs. In some examples, UE 915 may determine that the number of UEs fails to satisfy the second threshold number of UEs, and the clock frequency and may select the clock frequency and voltage level based at least in part on determining that the number of UEs fails to satisfy the second threshold number of UEs.

The clock frequency and the voltage level for UE 915 may include the clock frequency and voltage level for a modem of UE 915, the modem of UE 915 configured to operate according to a plurality of different clock frequencies or a plurality of different voltage levels, or both, based at least in part on the resource configuration for UE 915. The clock frequency and voltage level for the modem of UE 915 may include the clock frequency and voltage level for at least a portion of a receiver component of the modem or at least a portion of a transmitter component of the modem, or both. In some examples, UE 915 ay determine or identify a channel busy ratio for the sidelink wireless connection, and may identify the number of UEs based at least in part on the channel busy ratio. In some examples, UE 915 may perform an estimation procedure to determine the number of UEs.

At 925, UE 915 may communicate with UEs 905 on the sidelink wireless connection according to the determined clock frequency and voltage level. In some examples, the sidelink wireless connection may include a C-V2X wireless connection.

Figure 10:
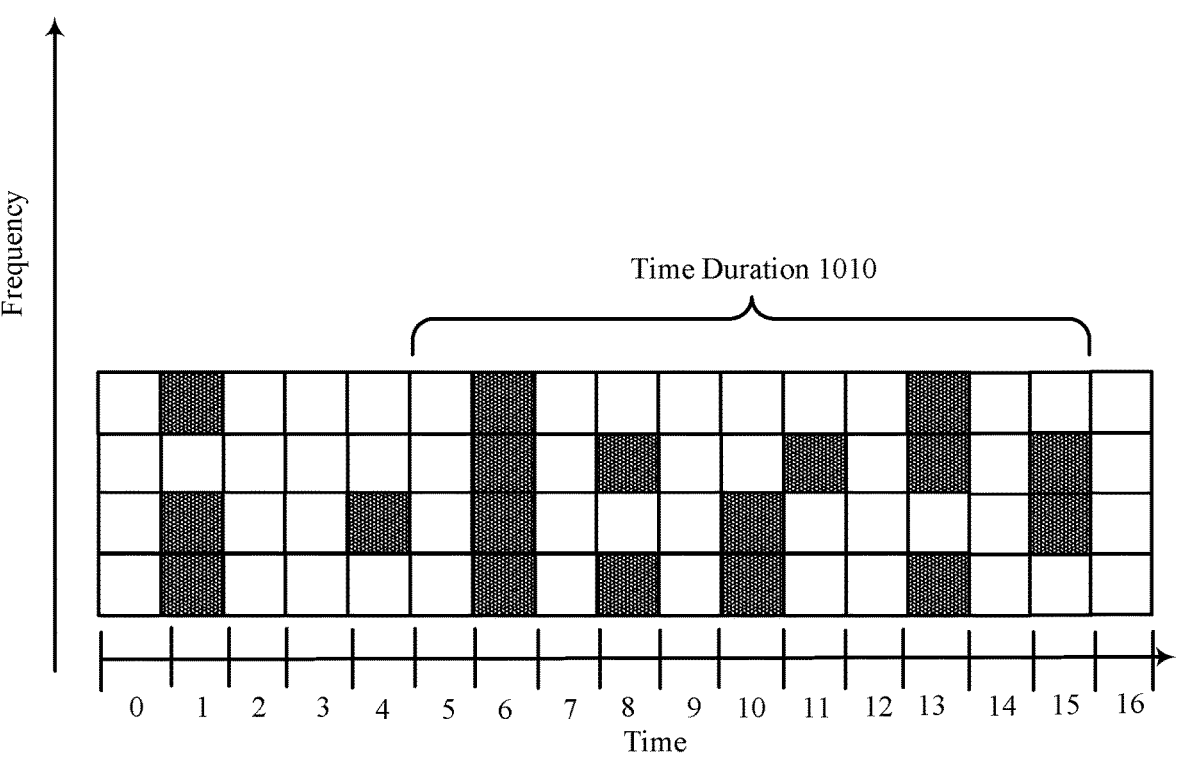
FIG. 10 illustrates an example of a monitoring scheme that may support adaptive operational mode setting techniques for circuits presented herein, in accordance with aspects of the present disclosure.

FIG. 10 illustrates an example of a monitoring scheme 1000 that supports adaptive operational mode setting for circuits in accordance with aspects of the present disclosure. In some examples, adaptive operational mode setting for circuits may be performed by V2X devices, V2V devices, C-V2X devices, or the like. In some examples, monitoring scheme 1000 may implement aspects of wireless communication system 100.

In some examples, a UE may select one or more parameter values (e.g., a clock frequency, a voltage level, or both) based on an estimated number of receive packets per TTI. The UE may receive various receive packets 1005 over sidelink resources from other UEs, a base station, or both. Required power expenditures for C-V2X applications may be based on an amount of receive packets 1005 per TTI (e.g., per symbol, per slot, per subframe, or the like).

A UE may estimate a number of expected receive packets 1005 by observing a number of receive packets 1005 during an observation window. For instance, the UE may monitor for receive packets 1005 during time duration 1010. In some examples, the UE may consider one or more parameters in determining the length of time duration 1010. For instance, if the UE is moving at a high speed, the UE may select a shorter time duration 1010. If the UE is moving at a lower speed or is stationary, then the UE may select a longer time duration 1010. Thus, the UE may adjust one or more parameters (e.g., may select voltage levels or clock frequency) based on whether the UE is moving faster or slower, is changing directions, has recently stopped, has recently begun to move, or the like.

In some examples, the UE may adjust one or more parameters based on one or more features surrounding the UE, a selected or current travel route, or the like. In some examples, the UE may adjust one or more parameters or an operational mode of a circuit based on it's location (e.g., an urban environment, a rural environment, or the like), an intended route or a likely route (e.g., based on past travel patterns, etc.) such as a highway, residential road, bike lane, freeway, or the like), a type of UE conveyance (e.g., a train, bullet train, car, bus, boat, bicycle, pedestrian travel, drone, or the like). In some examples, the UE may adjust one or more parameters or an operational mode of a circuit based on a current time (e.g., day or night) to address one or more likely traffic conditions (e.g., based on traffic levels, rush hours, weekends, holidays, events, or the like). In some examples, the UE may determine a current power status or charging status, and may adjust one or more parameters based thereon. For instance, the UE may determine whether it is recharging, plugged in, or may determine a current battery status or amount of remaining power, or the like. The UE may adjust one or more parameters based thereon. In some examples, adjusting one or more parameters or an operational mode of a circuit based on surrounding features, location information, route information, conveyance information, power information, or the like, may result in increased efficiency, decreased power expenditures, or both.

Having identified a number of receive packets 1005 during time duration 1010, the UE may utilize the information to estimate an amount of pending receive traffic in a subsequent time duration 1010. In some examples, the UE may use a total number of identified receive packets 1005 for estimation. For instance, during time duration 1010, the UE may identify fourteen receive packets 1005, and may estimate that it will receive about fourteen receive packets 1005 during a subsequent time duration 1010. In some examples, the UE may determine an average number of receive packets 1005 it expects to receive per TTI (e.g., per slot, per symbol, or per subframe). For instance, where time duration 1010 spans 11 slots (e.g., in a 5G NR system), the UE may determine an average number of receive packets 1005 received per slot. The UE may then estimate that it will receive the average number of receive packets 1005 in one subsequent slot, a set of subsequent slots, or a time duration 1010.

In some examples, the UE may set an initial parameter value (e.g., a clock frequency, a voltage level, or the like). The UE may set the initial parameter value based on a first estimation by observing during time duration 1010. Subsequently, the UE may receive one or more receive packets 1005 using the initial clock frequency and voltage level. Subsequently, the UE may adjust the clock frequency and voltage level from the initial clock frequency and voltage level. For instance, if the UE receives fewer receive packets 1005 than estimated, it may reduce its clock frequency and voltage level.

The UE may select one or more parameter values (e.g., a clock frequency, a voltage setting, or both) based on the estimated number of receive packets 1005 that will generate receive traffic. For instance, the UE may determine a number of threshold values (e.g., representing ranges of estimated number of receive packets 1005), and may determine which threshold values are satisfied by the estimated number of receive packets 1005. For instance, if an estimated number of receive packets 1005 does not satisfy a first threshold value (e.g., is less than the threshold), then the UE may select a first (e.g., lowest) clock frequency, voltage level, or both, that is associated with the first threshold. If the estimated number of receive packets 1005 does satisfy the first threshold value (e.g., is greater than or equal to the threshold) but does not satisfy a second higher threshold value (e.g., is less than the second threshold), then the UE may select a second (e.g., higher) clock frequency or voltage level associated with the second threshold. In some examples, the UE may identify a lookup table, and may identify an entry in the lookup table associated with the estimated number of receive packets 1005. The UE may then identify a clock frequency and a voltage level in the lookup table associated with the estimated number of receive packets 1005. In such examples, the UE may select the identified clock frequency and voltage levels, and may communicate using the selected clock frequency and voltage levels, as described with reference to FIG. 11.

Figure 11:
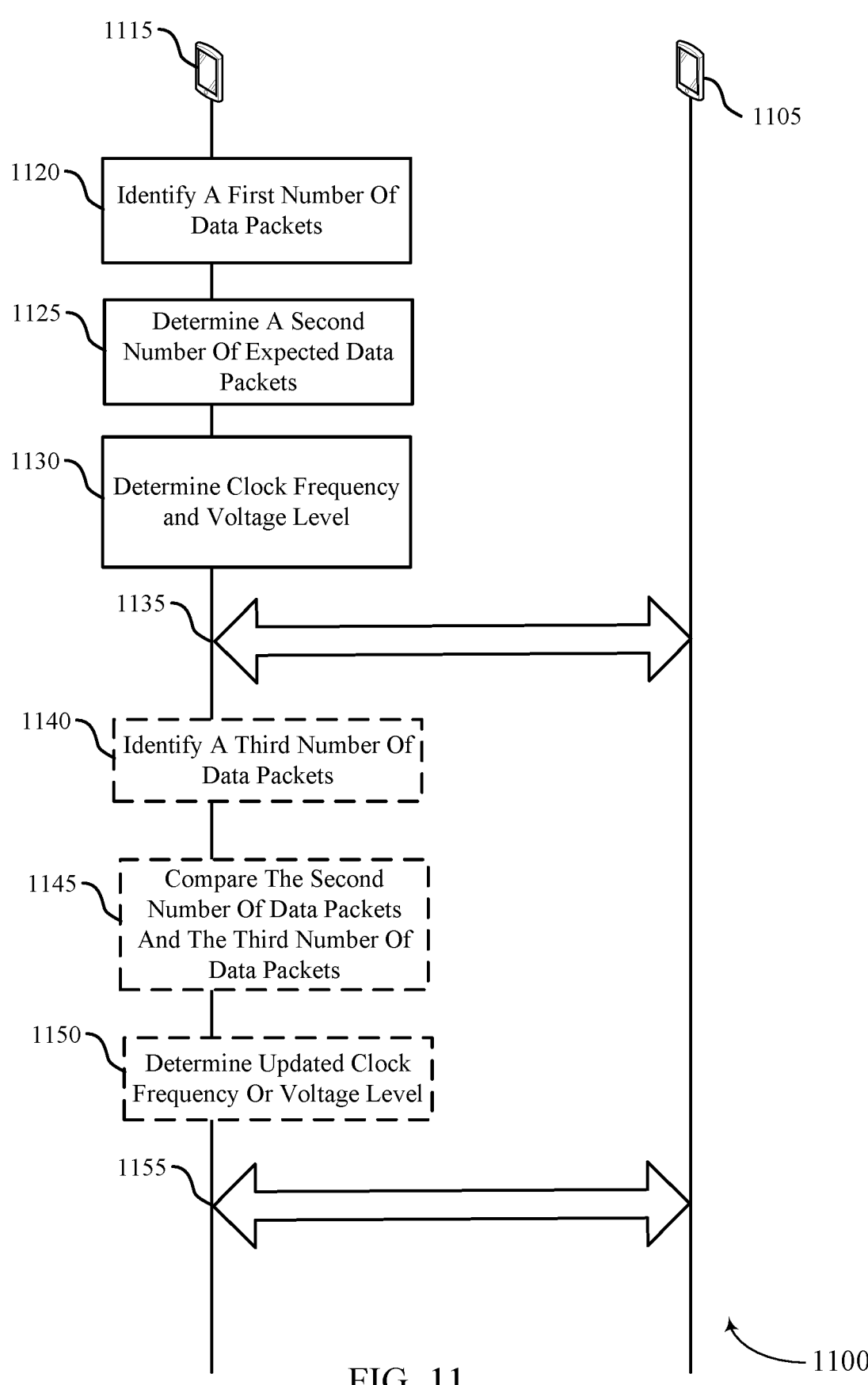
FIG. 11 illustrates an example of a process flow that may support adaptive operational mode setting techniques for circuits presented herein, in accordance with aspects of the present disclosure.

FIG. 11 illustrates an example of a process flow 1100 that supports adaptive operational mode setting for circuits accordance with aspects of the present disclosure. In some examples, adaptive operational mode setting for circuits may be performed by V2X devices, V2V devices, C-V2X devices, or the like. In some examples, process flow 1100 may implement aspects of wireless communication system 100. Process flow 1100 may include one or more UEs 1105 and a UE 1115. The UEs 1105 and 1115 may be examples of V2X devices. UEs 1105 and UE 1115 may be examples of corresponding devices described with reference to FIGS. 1, 2, 6, and 9.

At 1120, UE 1115 may identify a first number of data packets received in a first time duration.

At 1125, UE 1115 may determine a second number of data packets expected to be received in a second time duration.

At 1130, UE 1115 may determine a parameter value (e.g., a clock frequency, a voltage level, or both) for UE 1115. For example, UE 1115 may determine an average number of data packets per TTI, and may determine the second number of data packets based on the average. In some examples, the second number of data packets may be equal to the first number of packets.

For example, UE 1115 may identify a first threshold number of data packets associated with the parameter value (e.g., a first clock frequency, a first voltage level, or both) and a second threshold number of data packets associated with a second parameter value (e.g., a second clock frequency, a second voltage level, or both). UE 1115 may determine that the identified number of data packets satisfies the first threshold number of data packets, and may select the clock frequency and the voltage level based at least in part on determining that the identified number of data packets satisfies the first threshold frequency resource configuration. In some examples, UE 1115 may determine that the number of data packets fails to satisfy the second threshold number of data packets, and may set the clock frequency and the voltage level based at least in part on determining that the number of data packets fails to satisfy the second threshold number of data packets.

In some examples, the parameter value for UE 1115 may include the clock frequency and voltage level for a modem of UE 1115, the modem of UE 1115 configured to operate according to a plurality of different clock frequencies or a plurality of different voltage levels, or both, based at least in part on the frequency resource configuration for UE 1115. In some examples, the clock frequency and voltage level for the modem of UE 1115 may include the clock frequency and voltage level for at least a portion of a receiver component of the modem or at least a portion of a transmitter component of the modem, or both.

At 1135, UE 1115 may communicate with UEs 1105 according to the determined clock frequency and voltage level over a sidelink communications link. The duration of the time duration may be based movement or speed of UE 1115.

At 1140, UE 1115 may identify a third number of data packets actually received during a third time duration.

At 1145, UE 1115 may compare the second number of data packets and the third number of data packets.

At 1150, UE 1115 may determine an updated clock frequency or voltage level for UE 1115.

At 1155, UE 1115 may communicate with UEs 1105 on the sidelink communications connection according to the updated clock frequency and updated voltage level.

Figure 12:
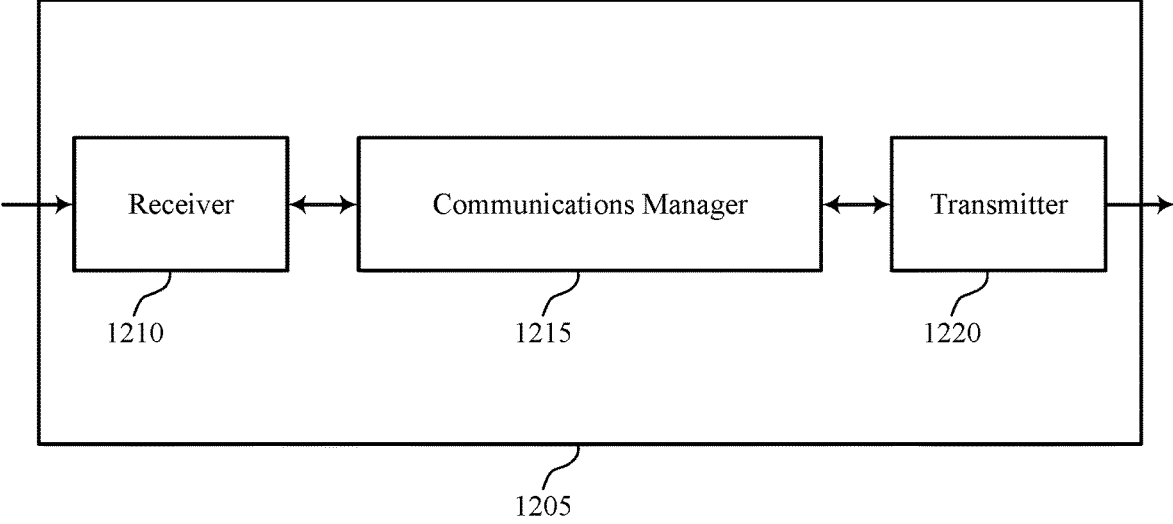
FIGS. 12 and 13 show block diagrams of devices that may support adaptive operational mode setting techniques for circuits presented herein, in accordance with aspects of the present disclosure.

FIG. 12 shows a block diagram 1200 of a device 1205 that supports adaptive operational mode setting for circuits in accordance with aspects of the present disclosure. In some examples, adaptive operational mode setting for circuits may be performed by V2X devices, V2V devices, C-V2X devices, or the like. The device 1205 may be an example of aspects of a UE 115 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to adaptive operational mode setting for circuits, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may identify a resource configuration for a sidelink wireless connection for communicating with at least a second UE, set an operational mode of a circuit of the first UE, based on the identified resource configuration, and use the circuit, at least in part, to communicate with the at least the second UE via the sidelink wireless connection. The communications manager 1215 may also identify a number of UEs configured to communicate with the first UE on a sidelink wireless connection, set an operational mode of a circuit of the first UE, based on the identified number of UEs, and use the circuit, at least in part, to communicate with at least a second UE of the number of UEs via the sidelink wireless connection. The communications manager 1215 may also identify a first number of data packets received in a first time duration, determine, based on the identified first number of data packets, a second number of data packets expected to be received in a second time duration, set an operational mode of a circuit of the first UE, based on the first number of data packets and the second number of data packets, and use the circuit, at least in part, to communicate with one or more UEs via the sidelink connection. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

In some examples, the communications manager 1215 may be implemented as an integrated circuit or chipset for a mobile device modem, and the receiver 1210 and transmitter 1220 may be implemented as analog components (e.g., amplifiers, filters, antennas) coupled with the mobile device modem to enable wireless transmission and reception over one or more bands.

The communications manager 1215 as described herein may be implemented to realize one or more potential advantages. One implementation may allow the device to experience efficient power expenditure, decreased temperature, improved communication, increased system reliability, and improved consistency of applications including safety related applications, among other benefits.

Figure 15:
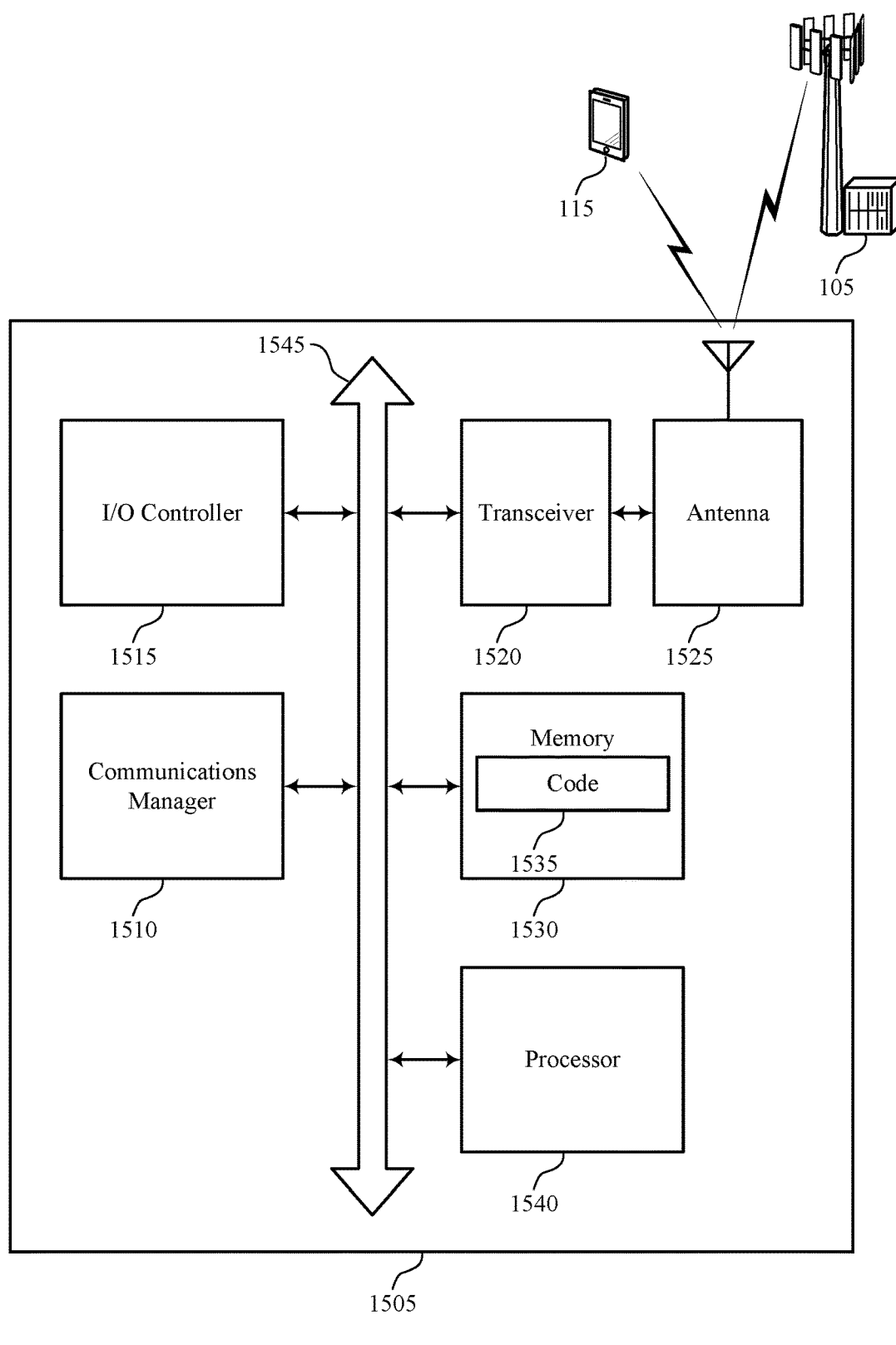
FIG. 15 shows a diagram of a system including a device that may support adaptive operational mode setting techniques for circuits presented herein, in accordance with aspects of the present disclosure.

Based on techniques for efficiently communicating maximum number of layers for a device as described herein, a processor of a UE 115 (e.g., controlling the receiver 1210, the transmitter 1220, or a transceiver 1520 as described with respect to FIG. 15) may increase system efficiency and decrease unnecessary processing at a device.

Figure 13:
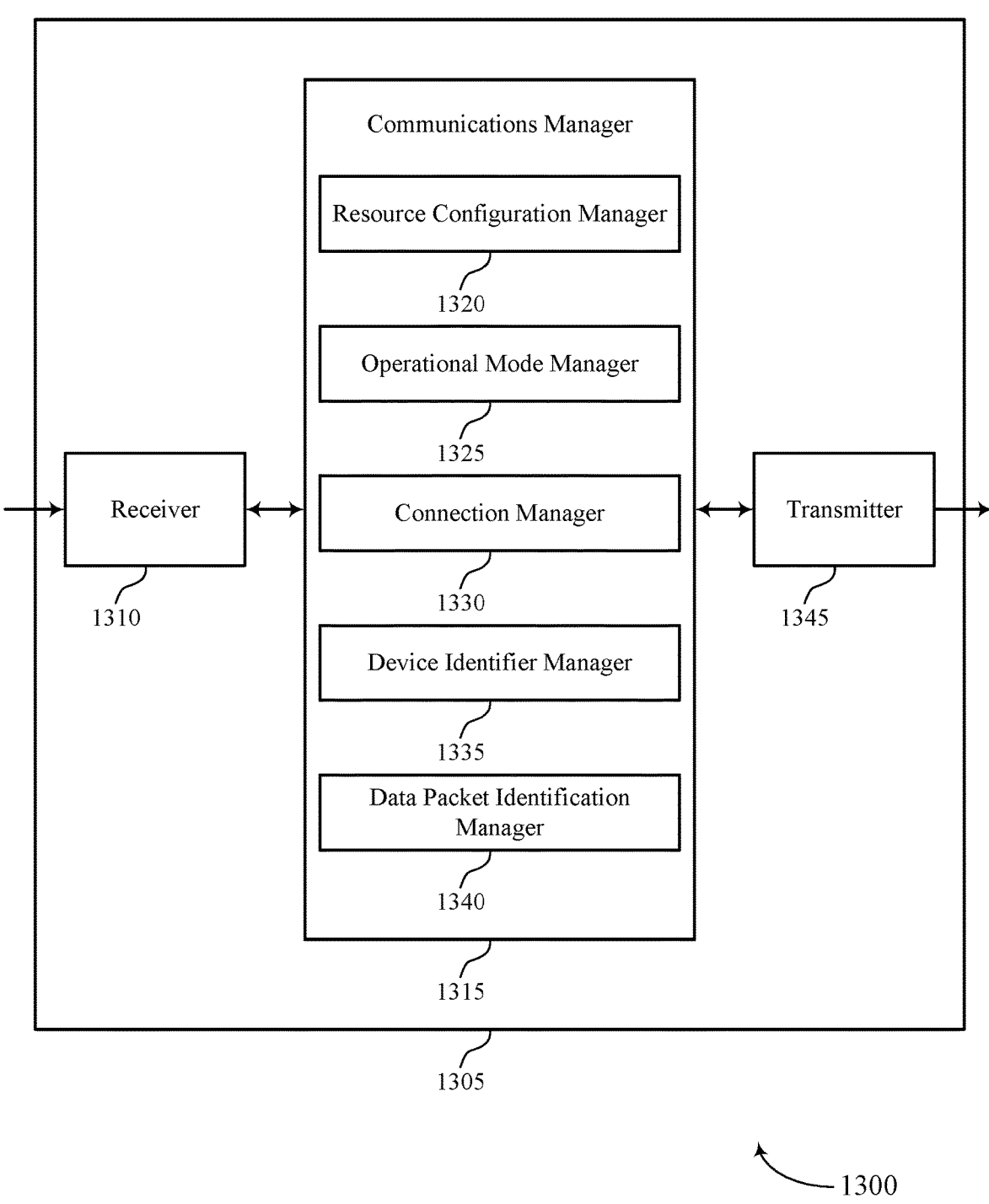

FIG. 13 shows a block diagram 1300 of a device 1305 that supports adaptive operational mode setting for circuits in accordance with aspects of the present disclosure. In some examples, adaptive operational mode setting for circuits may be performed by V2X devices, V2V devices, C-V2X devices, or the like. The device 1305 may be an example of aspects of a device 1205, or a UE 115 as described herein. The device 1305 may include a receiver 1310, a communications manager 1315, and a transmitter 1345. The device 1305 may also include a processor. Each of these components may be in communication with one another (e.g., via one or more buses).

The receiver 1310 may receive information such as packets, user data, or control information associated with various information channels (e.g., control channels, data channels, and information related to adaptive operational mode setting for circuits, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a resource configuration manager 1320, an operational mode manager 1325, a connection manager 1330, a device identifier manager 1335, and a data packet identification manager 1340. The communications manager 1315 may be an example of aspects of the communications manager 1510 described herein.

The resource configuration manager 1320 may identify a resource configuration for a sidelink wireless connection for communicating with at least a second UE.

The operational mode manager 1325 may set an operational mode of a circuit of the first UE, based on the identified resource configuration.

The connection manager 1330 may use the circuit, at least in part, to communicate with the at least the second UE via the sidelink wireless connection.

The device identifier manager 1335 may identify a number of UEs configured to communicate with the first UE on a sidelink wireless connection.

The operational mode manager 1325 may set an operational mode of a circuit of the first UE, based on the identified number of UEs.

The connection manager 1330 may use the circuit, at least in part, to communicate with at least a second UE of the number of UEs via the sidelink wireless connection.

The data packet identification manager 1340 may identify a first number of data packets received in a first time duration and determine, based on the identified first number of data packets, a second number of data packets expected to be received in a second time duration.

The operational mode manager 1325 may set an operational mode of a circuit of the first UE, based on the first number of data packets and the second number of data packets.

The connection manager 1330 may use the circuit, at least in part, to communicate with one or more UEs via the sidelink connection.

The transmitter 1345 may transmit signals generated by other components of the device 1305. In some examples, the transmitter 1345 may be collocated with a receiver 1310 in a transceiver module. For example, the transmitter 1345 may be an example of aspects of the transceiver 1520 described with reference to FIG. 15. The transmitter 1345 may utilize a single antenna or a set of antennas.

Figure 14:
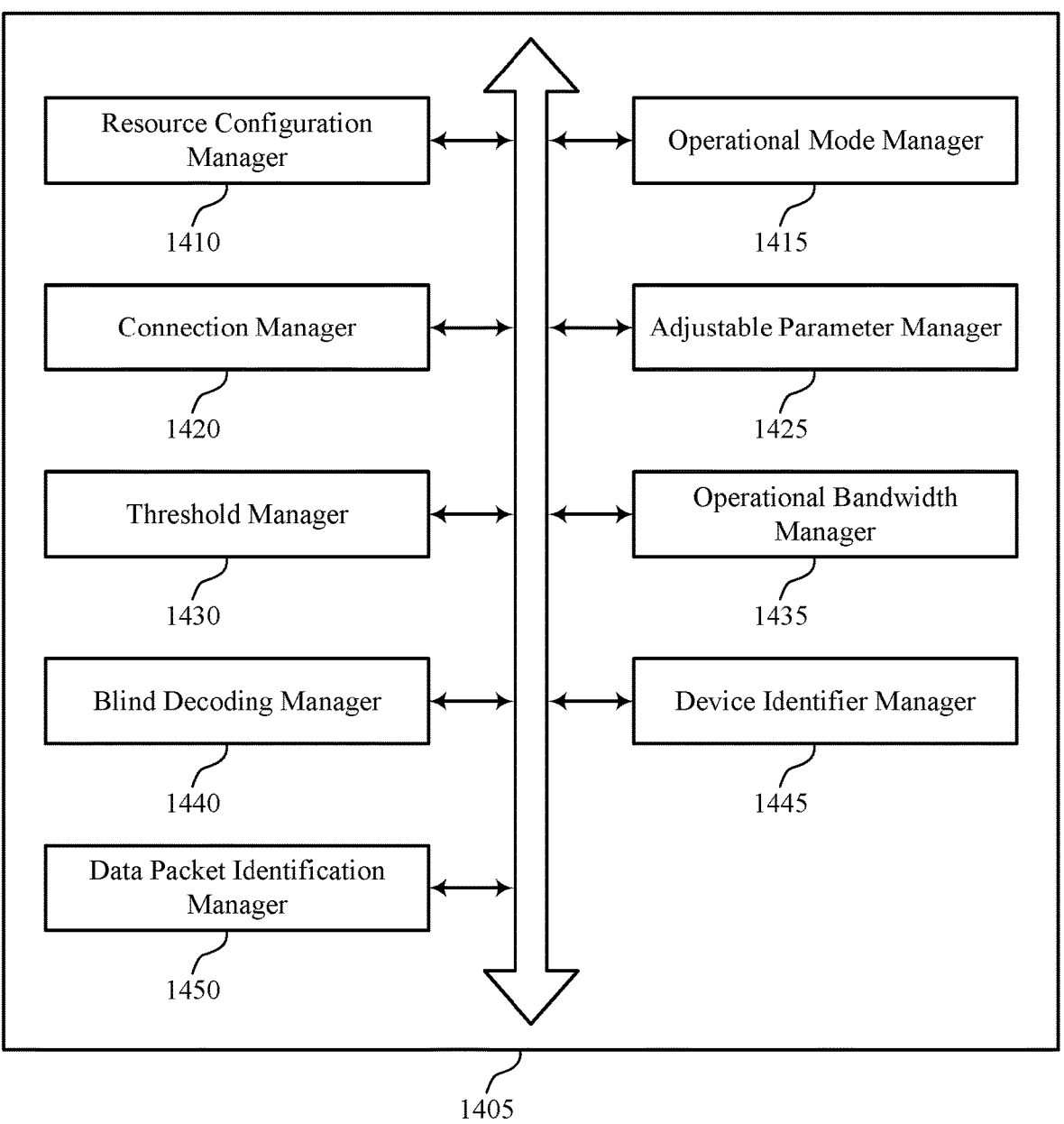
FIG. 14 shows a block diagram of a communications manager that may support adaptive operational mode setting techniques for circuits techniques presented herein, in accordance with aspects of the present disclosure.

FIG. 14 shows a block diagram 1400 of a communications manager 1405 that supports adaptive operational mode setting for circuits in accordance with aspects of the present disclosure. In some examples, adaptive operational mode setting for circuits may be performed by V2X devices, V2V devices, C-V2X devices, or the like. The communications manager 1405 may be an example of aspects of a communications manager 1215, a communications manager 1315, or a communications manager 1510 described herein. The communications manager 1405 may include a resource configuration manager 1410, an operational mode manager 1415, a connection manager 1420, an adjustable parameter manager 1425, a threshold manager 1430, an operational bandwidth manager 1435, a blind decoding manager 1440, a device identifier manager 1445, and a data packet identification manager 1450. Each of these modules may communicate, directly or indirectly, with one another (e.g., via one or more buses).

The resource configuration manager 1410 may identify a resource configuration for a sidelink wireless connection for communicating with at least a second UE. In some examples, the resource configuration manager 1410 may identify a number of subchannels within an operating bandwidth of the resource configuration, a size of subchannels within the operating bandwidth, a number of physical resource blocks per bandwidth, a subcarrier spacing, or a combination thereof.

In some examples, the resource configuration manager 1410 may receive configuration information from another device. In some examples, the resource configuration manager 1410 may identify the resource configuration for the sidelink wireless connection based, at least in part, on the configuration information. In some cases, the configuration information includes a radio resource control message, a system information block message, or some combination thereof. In some cases, the resource configuration is preconfigured at the first UE.

The operational mode manager 1415 may set an operational mode of a circuit of the first UE, based on the identified resource configuration. In some examples, the operational mode manager 1415 may set an operational mode of a circuit of the first UE, based on the identified number of UEs.

In some examples, the operational mode manager 1415 may set an operational mode of a circuit of the first UE, based on the first number of data packets and the second number of data packets. In some cases, the circuit includes, at least in part, at least a portion of a modem, a transceiver, a processor, memory, an integrated circuit, a circuit board, or some combination thereof of the first UE. In some cases, the circuit includes, at least in part, at least a portion of a modem, a transceiver, a processor, a memory, an integrated circuit, a circuit board, or some combination thereof of the first UE. In some cases, the circuit includes, at least in part, at least a portion of a modem, a transceiver, a processor, a memory, an integrated circuit, a circuit board, or some combination thereof of the first UE.

The connection manager 1420 may use the circuit, at least in part, to communicate with the at least the second UE via the sidelink wireless connection. In some examples, the connection manager 1420 may use the circuit, at least in part, to communicate with at least a second UE of the number of UEs via the sidelink wireless connection. In some examples, the connection manager 1420 may use the circuit, at least in part, to communicate with one or more UEs via the sidelink connection. In some examples, the connection manager 1420 may identify a channel busy ratio for the sidelink wireless connection, where identifying the number of UEs is identified based on the channel busy ratio.

In some examples, the connection manager 1420 may communicate with the one or more UEs on the sidelink wireless connection according to the updated operational mode of the circuit. In some cases, the sidelink wireless connection includes a C-V2X wireless connection.

The device identifier manager 1445 may identify a number of UEs configured to communicate with the first UE on a sidelink wireless connection. In some examples, the device identifier manager 1445 may identify a set of device identifiers associated with respective UEs of the number of UEs.

In some examples, the device identifier manager 1445 may identify a second number of UEs that communicate with the first UE in a first transmission time interval. In some examples, the device identifier manager 1445 may determine, based on the identified second number of UEs, the number of UEs configured to communicate with the first UE in a second TTI.

In some examples, the device identifier manager 1445 may perform an estimation procedure to determine the number of UEs configured to communicate with the first UE. In some cases, a duration of the first TTI is based on a movement of the first UE. In some cases, a duration of the first time duration is based on a movement of the first UE.

The data packet identification manager 1450 may identify a first number of data packets received in a first time duration. In some examples, the data packet identification manager 1450 may determine, based on the identified first number of data packets, a second number of data packets expected to be received in a second time duration.

In some examples, the data packet identification manager 1450 may determine, based on determining the first number of data packets received in the first time duration, an average number of data packets per transmission time interval, where determining the second number of data packets is based on the average number of data packets per transmission time interval. In some examples, the data packet identification manager 1450 may identify a third number of data packets received in a third time duration. In some examples, the data packet identification manager 1450 may compare the second number of data packets and the third number of data packets.

In some examples, the data packet identification manager 1450 may determine, based on comparing the second number of data packets and the third number of data packets, an updated operational mode of the circuit. In some cases, the second number of data packets is equal to the first number of data packets.

The adjustable parameter manager 1425 may determine the at least one adjustable parameter based on the identified resource configuration. In some examples, the adjustable parameter manager 1425 may determine the at least one adjustable parameter further based, at least in part on the at least one threshold value, such that the at least one adjustable parameter satisfies the at least one threshold value. In some examples, the adjustable parameter manager 1425 may determine the at least one adjustable parameter further based, at least in part, on the operating bandwidth.

In some examples, the adjustable parameter manager 1425 may determine the at least one adjustable parameter further based, at least in part, on the number of blind decoding procedures to be performed. In some examples, the adjustable parameter manager 1425 may determine the at least one adjustable parameter based on the identified number of UEs. In some examples, the adjustable parameter manager 1425 may determine the at least one adjustable parameter further based, at least in part on the at least one threshold value, such that the at least one adjustable parameter satisfies the at least one threshold value. In some examples, the adjustable parameter manager 1425 may determine the at least one adjustable parameter based on the first number of data packets and the second number of data packets.

In some examples, the adjustable parameter manager 1425 may determine the at least one adjustable parameter further based, at least in part, on the at least one threshold value, such that the at least one adjustable parameter satisfies the at least one threshold value. In some cases, the at least one adjustable parameter includes a clock frequency that is adjustable and utilized in at least a portion of the circuit. In some cases, the at least one adjustable parameter includes a voltage level that is adjustable and utilized in at least a part of the circuit.

The threshold manager 1430 may identify at least one threshold value corresponding to the at least one adjustable parameter. In some examples, the threshold manager 1430 may identify at least one threshold value corresponding to the at least one adjustable parameter. In some examples, the threshold manager 1430 may identify at least one threshold value corresponding to the at least one adjustable parameter.

The operational bandwidth manager 1435 may identify an operating bandwidth from a set of bandwidths of the resource configuration.

The blind decoding manager 1440 may identify a number of blind decoding procedures to be performed based, at least in part, on the resource configuration.

FIG. 15 shows a diagram of a system 1500 including a device 1505 that supports adaptive operational mode setting for circuits in accordance with aspects of the present disclosure. In some examples, adaptive operational mode setting for circuits may be performed by V2X devices, V2V devices, C-V2X devices, or the like. The device 1505 may be an example of or include the components of device 1205, device 1305, or a UE 115 as described herein. The device 1505 may include components for bi-directional voice and data communications including components for transmitting and receiving communications, including a communications manager 1510, an I/O controller 1515, a transceiver 1520, an antenna 1525, memory 1530, and a processor 1540. These components may be in electronic communication via one or more buses (e.g., bus 1545).

The communications manager 1510 may identify a resource configuration for a sidelink wireless connection for communicating with at least a second UE, set an operational mode of a circuit of the first UE, based on the identified resource configuration, and use the circuit, at least in part, to communicate with the at least the second UE via the sidelink wireless connection. The communications manager 1510 may also identify a number of UEs configured to communicate with the first UE on a sidelink wireless connection, set an operational mode of a circuit of the first UE, based on the identified number of UEs, and use the circuit, at least in part, to communicate with at least a second UE of the number of UEs via the sidelink wireless connection. The communications manager 1510 may also identify a first number of data packets received in a first time duration, determine, based on the identified first number of data packets, a second number of data packets expected to be received in a second time duration, set an operational mode of a circuit of the first UE, based on the first number of data packets and the second number of data packets, and use the circuit, at least in part, to communicate with one or more UEs via the sidelink connection.

The I/O controller 1515 may manage input and output signals for the device 1505. The I/O controller 1515 may also manage peripherals not integrated into the device 1505. In some cases, the I/O controller 1515 may represent a physical connection or port to an external peripheral. In some cases, the I/O controller 1515 may utilize an operating system such as iOS®, ANDROID®, MS-DOS®, MS-WIN-DOWS®, OS/2®, UNIX®, LINUX®, or another known operating system. In other cases, the I/O controller 1515 may represent or interact with a modem, a keyboard, a mouse, a touchscreen, or a similar device. In some cases, the I/O controller 1515 may be implemented as part of a processor. In some cases, a user may interact with the device 1505 via the I/O controller 1515 or via hardware components controlled by the I/O controller 1515.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM and ROM. The memory 1530 may store computer-readable, computer-executable code 1535 including instructions that, when executed, cause the processor to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting adaptive operational mode setting for circuits).

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
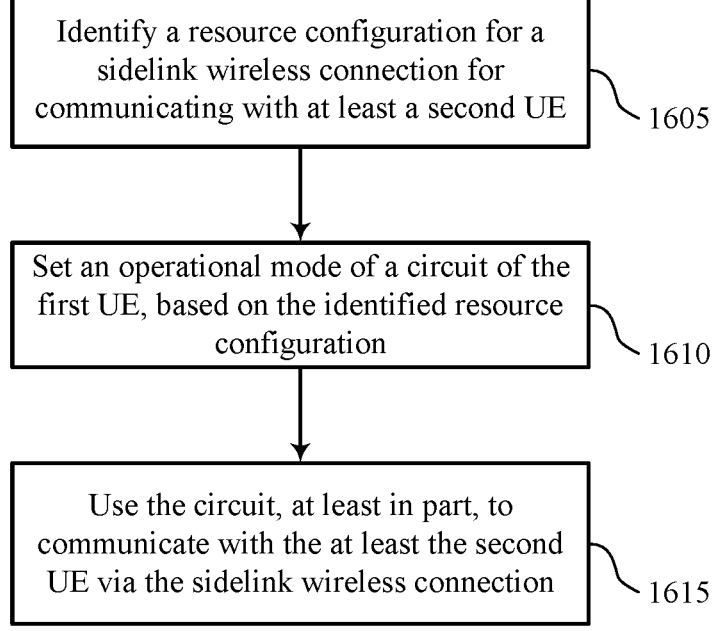

FIG. 16 shows a flowchart illustrating a method 1600 that supports adaptive operational mode setting for circuits in accordance with aspects of the present disclosure. In some examples, adaptive operational mode setting for circuits may be performed by V2X devices, V2V devices, C-V2X devices, or the like. The operations of method 1600 may be implemented by a UE 115 or its components as described herein. For example, the operations of method 1600 may be performed by a communications manager as described with reference to FIGS. 12 through 15. In some examples, a UE may execute a set of instructions to control the functional elements of the UE to perform the functions described below. Additionally, or alternatively, a UE may perform aspects of the functions described below using special-purpose hardware.

At 1605, the UE may identify a resource configuration for a sidelink wireless connection for communicating with at least a second UE. The operations of 1605 may be performed according to the methods described herein. In some examples, aspects of the operations of 1605 may be performed by a resource configuration manager as described with reference to FIGS. 12 through 15.

At 1610, the UE may set an operational mode of a circuit of the first UE, based on the identified resource configuration. The operations of 1610 may be performed according to the methods described herein. In some examples, aspects of the operations of 1610 may be performed by an operational mode manager as described with reference to FIGS. 12 through 15.

At 1615, the UE may use the circuit, at least in part, to communicate with the at least the second UE via the sidelink wireless connection. The operations of 1615 may be performed according to the methods described herein. In some examples, aspects of the operations of 1615 may be performed by a connection manager as described with reference to FIGS. 12 through 15.

Figure 17:
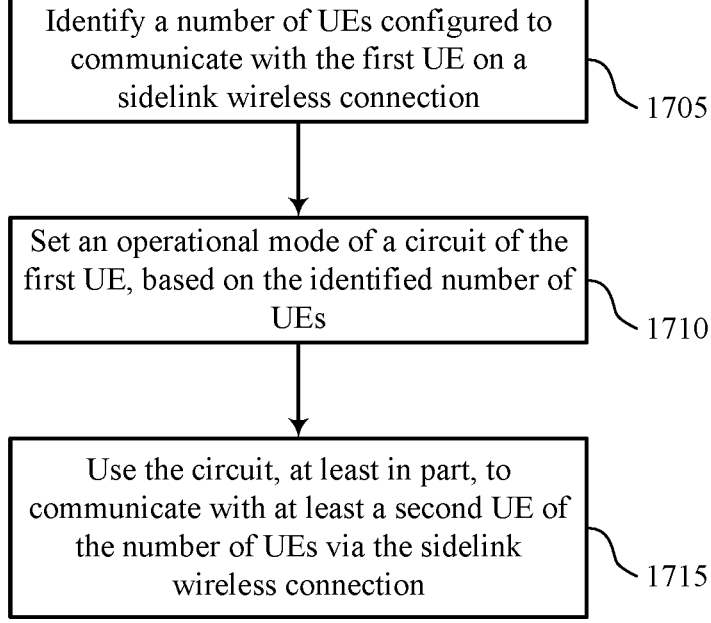

FIG. 17 shows a flowchart illustrating a method 1700 that supports adaptive operational mode setting for circuits in accordance with aspects of the present disclosure. In some examples, adaptive operational mode setting for circuits may be performed by V2X devices, V2V devices, C-V2X devices, or the like. The operations of method 1700 may be implemented by a UE 115 or its components as described herein. For example, the operations of method 1700 may be performed by a communications manager as described with reference to FIGS. 12 through 15. In some examples, a UE may execute a set of instructions to control the functional elements of the UE to perform the functions described below. Additionally, or alternatively, a UE may perform aspects of the functions described below using special-purpose hardware.

At 1705, the UE may identify a number of UEs configured to communicate with the first UE on a sidelink wireless connection. The operations of 1705 may be performed according to the methods described herein. In some examples, aspects of the operations of 1705 may be performed by a device identifier manager as described with reference to FIGS. 12 through 15.

At 1710, the UE may set an operational mode of a circuit of the first UE, based on the identified number of UEs. The operations of 1710 may be performed according to the methods described herein. In some examples, aspects of the operations of 1710 may be performed by an operational mode manager as described with reference to FIGS. 12 through 15.

At 1715, the UE may use the circuit, at least in part, to communicate with at least a second UE of the number of UEs via the sidelink wireless connection. The operations of 1715 may be performed according to the methods described herein. In some examples, aspects of the operations of 1715 may be performed by a connection manager as described with reference to FIGS. 12 through 15.

FIG. 18 shows a flowchart illustrating a method 1800 that supports adaptive operational mode setting for circuits in accordance with aspects of the present disclosure. In some examples, adaptive operational mode setting for circuits may be performed by V2X devices, V2V devices, C-V2X devices, or the like. The operations of method 1800 may be implemented by a UE 115 or its components as described herein. For example, the operations of method 1800 may be performed by a communications manager as described with reference to FIGS. 12 through 15. In some examples, a UE may execute a set of instructions to control the functional elements of the UE to perform the functions described below. Additionally, or alternatively, a UE may perform aspects of the functions described below using special-purpose hardware.

At 1805, the UE may identify a first number of data packets received in a first time duration. The operations of 1805 may be performed according to the methods described herein. In some examples, aspects of the operations of 1805 may be performed by a data packet identification manager as described with reference to FIGS. 12 through 15.

At 1810, the UE may determine, based on the identified first number of data packets, a second number of data packets expected to be received in a second time duration. The operations of 1810 may be performed according to the methods described herein. In some examples, aspects of the operations of 1810 may be performed by a data packet identification manager as described with reference to FIGS. 12 through 15.

At 1815, the UE may set an operational mode of a circuit of the first UE, based on the first number of data packets and the second number of data packets. The operations of 1815 may be performed according to the methods described herein. In some examples, aspects of the operations of 1815 may be performed by an operational mode manager as described with reference to FIGS. 12 through 15.

At 1820, the UE may use the circuit, at least in part, to communicate with one or more UEs via the sidelink connection. The operations of 1820 may be performed according to the methods described herein. In some examples, aspects of the operations of 1820 may be performed by a connection manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a first user equipment (UE), comprising:
   one or more processors;
   one or more memories coupled with the one or more processors and storing instructions executable by the one or more processors to cause the UE to:
   identify a resource configuration for a sidelink wireless connection for communicating with at least a second UE;
   identify a number of blind decoding procedures to be performed based, at least in part, on the resource configuration;
   select at least one adjustable parameter of a circuit of the first UE further based, at least in part, on the number of blind decoding procedures to be performed;
   set an operational mode of the circuit of the first UE, based at least in part on the resource configuration and selecting the at least one adjustable parameter; and use the circuit, at least in part, to communicate with the at least the second UE via the sidelink wireless connection.

2. The apparatus of claim 1, wherein the operational mode of the circuit is set via the at least one adjustable parameter, and wherein the instructions are further executable by the one or more processors to cause the UE to:
   select the at least one adjustable parameter based at least in part on the resource configuration.

3. The apparatus of claim 2, wherein the at least one adjustable parameter comprises a clock frequency that is adjustable and utilized in at least a portion of the circuit.

4. The apparatus of claim 2, wherein the at least one adjustable parameter comprises a voltage level that is adjustable and utilized in at least a part of the circuit.

5. The apparatus of claim 2, wherein the instructions are further executable by the one or more processors to cause the UE to:
   identify at least one threshold value corresponding to the at least one adjustable parameter; and
   select the at least one adjustable parameter further based, at least in part on the at least one threshold value, such that the at least one adjustable parameter satisfies the at least one threshold value.

6. The apparatus of claim 2, wherein the instructions are further executable by the one or more processors to cause the UE to:
   identify an operating bandwidth from a set of bandwidths of the resource configuration; and
   select the at least one adjustable parameter further based, at least in part, on the operating bandwidth.

7. The apparatus of claim 1, wherein the instructions to identify the resource configuration are executable by the one or more processors to cause the UE to:
   identify a number of subchannels within an operating bandwidth of the resource configuration, a size of subchannels within the operating bandwidth, a number of physical resource blocks per bandwidth, a subcarrier spacing, or a combination thereof.

8. The apparatus of claim 1, wherein the circuit comprises, at least in part, at least a portion of a modem, a transceiver, a processor, memory, an integrated circuit, a circuit board, or some combination thereof of the first UE.

9. The apparatus of claim 1, wherein the instructions to identify the resource configuration for the sidelink wireless connection are executable by the one or more processors to cause the UE to:
   receive configuration information from another device; and
   identify the resource configuration for the sidelink wireless connection based, at least in part, on the configuration information.

10. The apparatus of claim 9, wherein the configuration information comprises a radio resource control message, a system information block message, or some combination thereof.

11. The apparatus of claim 1, wherein the resource configuration is preconfigured at the first UE.

12. The apparatus of claim 1, wherein the sidelink wireless connection comprises a cellular vehicle to everything (C-V2X) wireless connection.

13. An apparatus for wireless communications at a first user equipment (UE), comprising:
   one or more processors;
   one or more memories coupled with the one or more processors and storing instructions executable by the one or more processors to cause the UE to:

identify a second number of UEs that communicate with the first UE in a first transmission time interval;

identify, based at least in part on the second number of UEs, a number of UEs configured to communicate with the first UE on a sidelink wireless connection in a transmission time interval (TTI);

set an operational mode of a circuit of the first UE, based at least in part on the number of UEs;

use the circuit, at least in part, to communicate with at least a second UE of the number of UEs via the sidelink wireless connection.

14. The apparatus of claim 13, wherein the operational mode of the circuit is set via at least one adjustable parameter, and wherein the instructions are further executable by the one or more processors to cause the UE to:

select the at least one adjustable parameter based at least in part on the number of UEs.

15. The apparatus of claim 14, wherein the at least one adjustable parameter comprises a clock frequency that is adjustable and utilized in at least a portion of the circuit.

16. The apparatus of claim 14, wherein the at least one adjustable parameter comprises a voltage level that is adjustable and utilized in at least a part of the circuit.

17. The apparatus of claim 13, wherein the instructions to identify the number of UEs are executable by the one or more processors to cause the UE to:

identify a set of device identifiers associated with respective UEs of the number of UEs.

18. The apparatus of claim 13, wherein a duration of the TTI is based at least in part on a movement of the first UE.

19. The apparatus of claim 13, wherein the instructions to set the operational mode of the circuit of the first UE are executable by the one or more processors to cause the UE to:

identify at least one threshold value corresponding to at least one adjustable parameter; and select the at least one adjustable parameter further based, at least in part on the at least one threshold value, such that the at least one adjustable parameter satisfies the at least one threshold value.

20. The apparatus of claim 13, wherein the circuit comprises, at least in part, at least a portion of a modem, a transceiver, a processor, a memory, an integrated circuit, a circuit board, or some combination thereof of the first UE.

21. The apparatus of claim 13, wherein the instructions are further executable by the one or more processors to cause the UE to:

identify a channel busy ratio for the sidelink wireless connection, wherein the instructions to identify the number of UEs are executable by the one or more processors to cause the UE to identify the number of UEs based at least in part on the channel busy ratio.

22. The apparatus of claim 13, wherein the instructions to identify the number of UEs are executable by the one or more processors to cause the UE to:

perform an estimation procedure to determine the number of UEs configured to communicate with the first UE.

23. The apparatus of claim 13, wherein the sidelink wireless connection comprises cellular vehicle to everything (C-V2X) wireless connection.

24. An apparatus for wireless communications at a first user equipment (UE), comprising:

one or more processors;

one or more memories coupled with the one or more processors and storing instructions executable by the one or more processors to cause the UE to:

identify a first number of data packets received in a first time duration;

determine, based at least in part on identifying the first number of data packets received in the first time duration, an average number of data packets per transmission time interval;

determine, based at least in part on the first number of data packets, a second number of data packets expected to be received in a second time duration based at least in part on the average number of data packets per transmission time interval (TTI);

set an operational mode of a circuit of the first UE, based at least in part on the first number of data packets and the second number of data packets; and use the circuit, at least in part, to communicate with one or more UEs via a sidelink connection.

25. The apparatus of claim 24, wherein the operational mode of the circuit is set via at least one adjustable parameter, and wherein the instructions are further executable by the one or more processors to cause the UE to:

select the at least one adjustable parameter based at least in part on the first number of data packets and the second number of data packets.

26. The apparatus of claim 25, wherein the at least one adjustable parameter comprises a clock frequency that is adjustable and utilized in at least a portion of the circuit.

27. The apparatus of claim 25, wherein the at least one adjustable parameter comprises a voltage level that is adjustable and utilized in at least a part of the circuit.

28. The apparatus of claim 24, wherein a duration of the first time duration is based at least in part on a movement of the first UE.

29. The apparatus of claim 24, wherein the second number of data packets is equal to the first number of data packets.

30. The apparatus of claim 24, wherein the instructions are further executable by the one or more processors to cause the UE to:

identify a third number of data packets received in a third time duration;

compare the second number of data packets and the third number of data packets;

determine, based at least in part on comparing the second number of data packets and the third number of data packets, an updated operational mode of the circuit; and communicate with the one or more UEs on the sidelink wireless connection according to the updated operational mode of the circuit.

31. The apparatus of claim 24, wherein the instructions are further executable by the one or more processors to cause the UE to:

identify at least one threshold value corresponding to at least one adjustable parameter;

select the at least one adjustable parameter further based, at least in part, on the at least one threshold value, such that the at least one adjustable parameter satisfies the at least one threshold value.

32. The apparatus of claim 24, wherein the circuit comprises, at least in part, at least a portion of a modem, a transceiver, a processor, a memory, an integrated circuit, a circuit board, or some combination thereof of the first UE.

* * * * *